(12) United States Patent
Lacapra

(10) Patent No.: US 9,059,976 B2
(45) Date of Patent: *Jun. 16, 2015

(54) SOFTWARE-DEFINED NETWORK ATTACHABLE STORAGE SYSTEM AND METHOD

(71) Applicant: Peaxy, Inc., San Jose, CA (US)

(72) Inventor: Francesco Lacapra, Sunnyvale, CA (US)

(73) Assignee: Peaxy, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,937

(22) Filed: Jun. 19, 2014

(65) Prior Publication Data

US 2014/0297734 A1   Oct. 2, 2014

Related U.S. Application Data

(63) Continuation of application No. 13/759,799, filed on Feb. 5, 2013, now Pat. No. 8,769,105.

(60) Provisional application No. 61/701,441, filed on Sep. 14, 2012.

(51) Int. Cl.
*G06F 15/173* (2006.01)
*G06F 15/167* (2006.01)
*H04L 29/08* (2006.01)
*H04L 29/06* (2006.01)

(52) U.S. Cl.
CPC ............. *H04L 67/06* (2013.01); *H04L 67/02* (2013.01); *H04L 67/1097* (2013.01); *H04L 69/164* (2013.01)

(58) Field of Classification Search
USPC .................. 709/201–203, 213–229
See application file for complete search history.

(56) References Cited

U.S. PATENT DOCUMENTS 7,272,654 B1    9/2007  Brendel ............... 709/229
8,296,398 B2   10/2012  Lacapra et al. ........ 709/219

(Continued)

OTHER PUBLICATIONS

Butt, et al. *Kosha: A Peer-to-Peer Enhancement for the Network File System*, in Proceedings of the ACM/IEEE SC2004: High Performance Computing, Networking and Storage Conference, Pittsburgh, PA, Nov. 6-12.

(Continued)

*Primary Examiner* — Abdullahi Salad
(74) *Attorney, Agent, or Firm* — Sunstein Kann Murphy & Timbers LLP

(57) ABSTRACT

A method for establishing a software-defined network attachable storage system includes establishing first and second sets of logical computer systems (which may be virtual computer systems) as namespace servers and dataspace servers respectively. Each namespace server is configured: (a) to store, in its memory, filesystem metadata, the metadata including file and directory names and information on where user data associated with the file and directory names resides, and to store in its storage system a dynamically updated copy of the filesystem metadata; and (b) to process storage system pathname requests, for a predetermined subset of the namespace, from at least one requesting client computer and to return in response to each request a handle for use by the requesting client computer; and (ii) each dataspace server is configured to store and retrieve user data in its storage system based on handles determined by the namespace servers.

21 Claims, 4 Drawing Sheets

(56) References Cited

U.S. PATENT DOCUMENTS

| | | | |
|---|---|---|---|
| 8,433,735 B2 | 4/2013 | Lacapra | 707/828 |
| 2003/0140051 A1 | 7/2003 | Fujiwara et al. | 707/999.1 |
| 2004/0015494 A1 | 1/2004 | Basso et al. | 707/3 |
| 2005/0144292 A1 | 6/2005 | Banga et al. | 709/227 |
| 2009/0254468 A1 | 10/2009 | Acedo et al. | 705/35 |
| 2009/0327312 A1 | 12/2009 | Kakivaya et al. | 707/10 |
| 2010/0082546 A1 | 4/2010 | Sreenivas et al. | 707/641 |
| 2011/0167236 A1 | 7/2011 | Orikasa et al. | 711/165 |

OTHER PUBLICATIONS

ISA/US Commissioner for Patents, Authorized Officer Lee W. Young, International Search Report and Written Opinion, PCT/US13/57330, date of mailing Mar. 21, 2014, 18 pages.

Traditional NAS I/O (Prior Art)

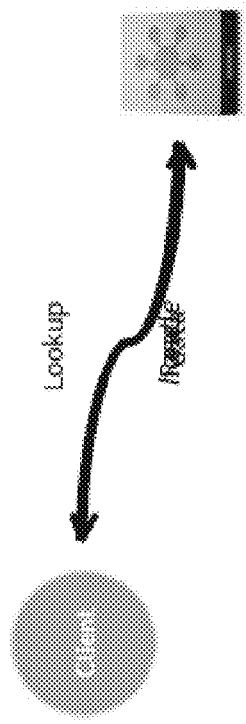

- To open "/mnt/netapp/a/b/c/d/E":
  1. Look up "/" and read i-node
  2. Read of "/" data to retrieve the i-number of "a" - return handle
  3. Look up "a" and read i-node
  4. Read of "a" data to retrieve the i-number of "b" - return handle
  5. Look up "b" and read i-node
  6. Read of "b" data to retrieve the i-number of "c" - return handle
  7. Look up "c" and read i-node
  8. Read of "c" data to retrieve the i-number of "d" - return handle
  9. Look up "d" and read i-node
  10. Read of "d" data to retrieve the i-number of "E" - return handle
  11. Read "E" data - return data

- Total: 10 disk I/Os + 6 network I/Os

Typically 4 directory levels needed for good directory access speed

*Fig. 2*

SOFTWARE-DEFINED NETWORK ATTACHABLE STORAGE SYSTEM AND METHOD

CROSS-REFERENCE TO RELATED APPLICATION

This application is a continuation of U.S. application Ser. No. 13/759,799, entitled "Software-Defined Network Attachable Storage System and Method" and filed Feb. 5, 2013, which claims the benefit of U.S. Application No. 61/701,441, entitled "Software-Defined Network Attachable Storage System and Method" and filed Sep. 14, 2012, both of which are hereby incorporated by reference in their entireties.

TECHNICAL FIELD

The present invention relates to network attachable storage systems and more particularly to storage systems that are software-defined.

BACKGROUND ART

Extensive literature exists on network-attachable storage systems.

SUMMARY OF THE EMBODIMENTS

In a first embodiment of the invention there is provided a method for establishing a software-defined network attachable storage system in a plurality of logical computer systems. Each computer system has memory, a processor, and a storage system. The method includes running a set of programs in the logical computer systems. The set of programs establish a plurality of namespace servers, each of which operates autonomously in a distinct partition of a namespace. The set of programs also establish a plurality of dataspace servers, each of which operates in an assigned partition of a dataspace associated with the storage system.

In this embodiment, in order to process a given pathname request from at least one requesting client computer, the at least one requesting client computer computes a hash value based on the given pathname and uses the hash value with a hash table to obtain the identity of a specific one of the namespace servers. The specific one of the namespace servers is configured to store persistently, in its memory, filesystem metadata associated with the distinct partition of the namespace corresponding to the specific one of the namespace servers. The specific one of the namespace servers is also configured to use the metadata that is persistently stored in its memory in processing the given storage system pathname request from the at least one requesting client computer to return to the at least one requesting client computer a handle that identifies a particular one of the dataspace servers and a particular logical block index in the dataspace.

The handle is used by the at least one requesting client computer to select the particular one of the dataspace servers. Further, the particular one of the dataspace servers satisfies the given pathname request by accessing the particular logical block index in the dataspace identified by the handle.

In some embodiments, at least one proper subset of the namespace servers is configured to operate as a cluster. Each namespace server in the cluster processes pathname requests for a shared distinct partition of the namespace, and stores persistently, in its memory, filesystem metadata associated with the shared distinct partition.

In some embodiments, the number of namespace servers in the cluster is selected to achieve desired levels of speed, redundancy, and availability under projected load conditions.

In some embodiments, at least one proper subset of the dataspace servers is configured to operate as a cluster, to store and retrieve user data in its storage system based on handles determined by the namespace servers, for a shared distinct partition of the dataspace. The number of dataspace servers may be the cluster is selected to achieve desired levels of speed, redundancy, and availability under projected load conditions.

In some embodiments, at least some of the logical computer systems are virtual computer systems. The first and second sets of logical computer systems may be disjoint, or not disjoint.

The filesystem metadata may be structured according a Patricia Tree data structure so that shared prefixes of pathnames are stored compactly. The filesystem metadata may be stored in a nodes table encoding the Patricia Tree, a file table encoding attributes of files and directories, and/or a string table encoding names, of strings, having a length greater than a maximum length used in the nodes table. Each of the nodes table, the file table, and the string table may be dynamically stored in a distinct file for persistence. Further, any change to any of the nodes table, the file table, or the string table may be stored in an intent log. The intent log may be used dynamically to update the files corresponding to such tables.

In some embodiments, in the course of handling updates to the shared distinct partition of namespace data being managed by the cluster, each successive update thereto is given a sequence number. Further, logical computer systems of the cluster are configured to operate asynchronously while still retaining a predefined order of updating based on the sequence number.

In some embodiments, the at least one requesting client computer computes the hash value using a hash function, which performs a many-to-one mapping of a parent directory for the pathname to an entry in the hash table. In some embodiments, the hash table stores hyperserver identification numbers used to identify the namespace servers. Each hyperserver identification number may be associated with a set of IP addresses, and each IP address may correspond to a member of the hyperserver.

In some embodiments, a network layer of the at least one requesting client computer client converts a hyperserver identification number of the specific one of the namespace servers to an IP address of a member of a hyperserver. In some embodiments, the specific one of the namespace servers determines, based on the given storage system pathname request from the at least one requesting client computer, whether the hash table stored on the at least one requesting client computer is out of date. In the event that the hash table is determined to be out of date, the specific one of the namespace servers sends an out-of-date message to the at least one requesting client computer.

In some embodiments, the specific one of the namespace servers determines whether the hash table is out of date based on a generation number in the given storage system pathname request. In response to the out-of-date message, the at least one requesting client computer is caused to update its hash table. In the event that the hash table on the at least one requesting client computer has become out of date owing to enlargement of the namespace to include at least one additional namespace server, redistribution of entries in the namespace, or enlargement of the hash table, the at least one requesting client computer is caused to update its hash table to obtain a hash table corresponding to the enlarged namespace.

In the event that the hash table on the at least one requesting client computer has become out of date owing to a rearrangement of the namespace, the at least one requesting client computer is caused to update at least a portion of its hash table to obtain a hash table corresponding to the rearranged namespace.

BRIEF DESCRIPTION OF THE DRAWINGS

The foregoing features of embodiments will be more readily understood by reference to the following detailed description, taken with reference to the accompanying drawings, in which:

FIG. 2 is a diagram illustrating disk and network I/O operations that are typical of prior art network attached storage (NAS) systems for accessing a file with a path name including several subdirectories;

DETAILED DESCRIPTION OF SPECIFIC EMBODIMENTS

Definitions

Figure 1:
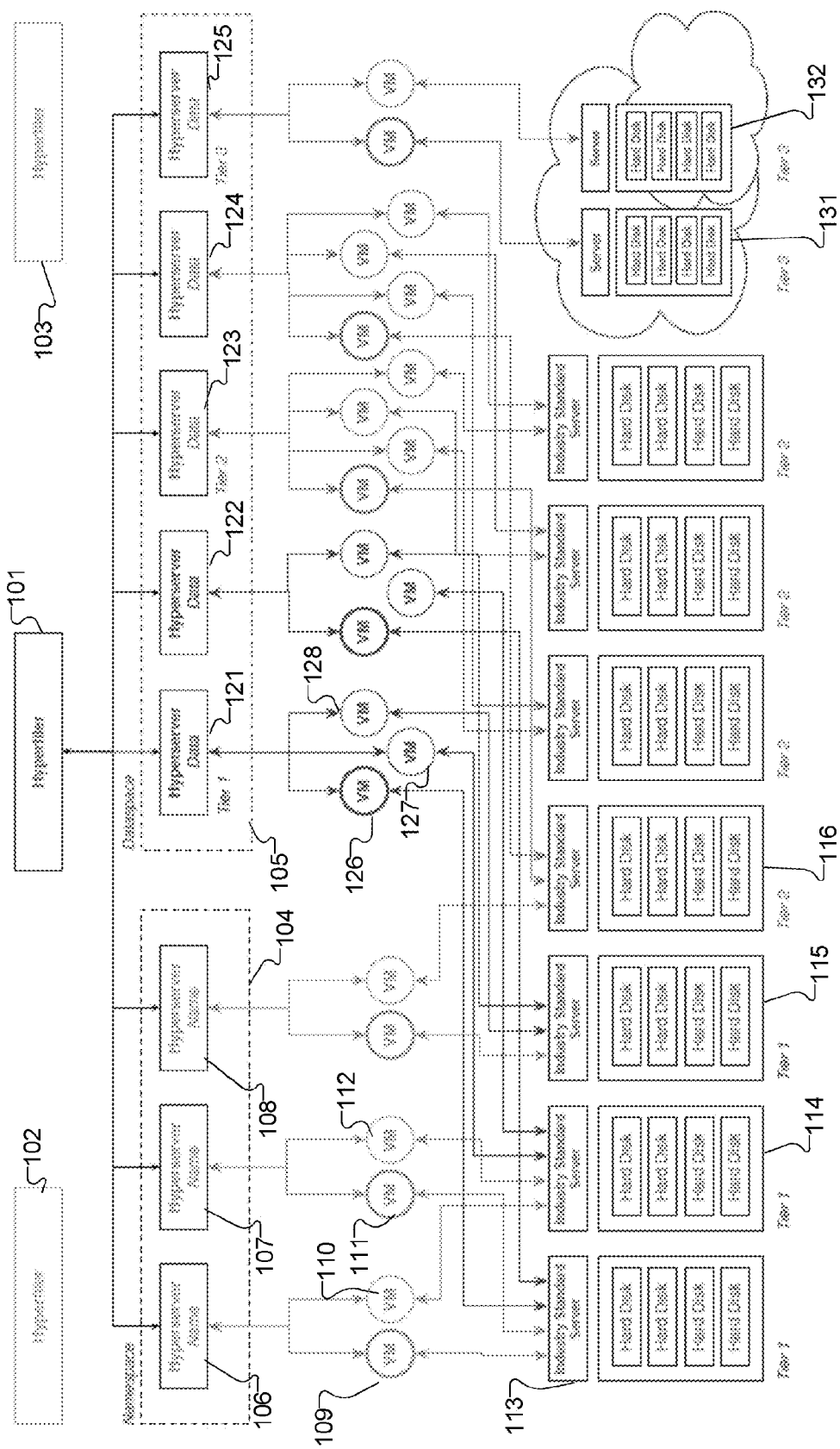
FIG. 1 is a block diagram of a Hyperfiler in accordance with an embodiment of the present invention.

As used in this description and the accompanying claims, the following terms shall have the meanings indicated, unless the context otherwise requires:

The "active directory" is a version of the directory, residing on the hyperserver, where its own name is hashed, and is the directory used to create, delete, list and access files and subdirectories. In the Hyperfiler each directory may have two versions: the active directory, as just described, and the passive directory. The passive directory has its parent directory hashed and is present to be properly reported in the listings and traversals of its parent. Occasionally the active directory and the passive directory may hash to the same hyperserver and therefore collapse into a single directory.

The "backing store" is the collection of three files that replicate the content of the Node Table, the String Table and the File Table.

"Cardinality" of a hyperserver is the number dictating the count of hyperserver members that are configured in the hyperserver. Each hyperserver in a Hyperfiler can have a different cardinality, in the range 1-4, depending on the level of redundancy one chooses to implement.

A Hyperfiler "Client" is any computer that performs the Mount of a directory in the file system namespace of a Hyperfiler. A Hyperfiler Client runs a FUSE client component to remotely access storage services via Remote Procedure Calls (RPCs) that issue requests for the various services available. The mount operation loads all the data structures a client needs to interact with the Hyperfiler, and the Hyperfiler will update these data structures as they change. The term "client computer" includes a server that is acting as its own client.

The "dataspace" is the part of the Hyperfiler that manages the storage resources where user file data is stored. The entire dataspace is partitioned through all the data-capable hyperservers in the Hyperfiler, each of which is configured to offer a specified level of cardinality. This enables storing vital data within hyperservers that manage hypervolumes with the highest cardinality, whereas data that is transient in nature can be stored on hypervolumes with cardinality set to 1, to optimize storage costs. Files and symbolic links are stored as aggregations of logically contiguous Extents.

The "Directory Hash Table (DHT)" is a table used in performing all pathname-based operations. A hash function known to all the Hyperfiler members and clients performs a many-to-one mapping of the name of the parent directory of the file system object of interest into a slot in the DHT. The target slot contains the HID of the hyperserver to be used to perform operations on that object. Effectively this table allows the entire global namespace to be partitioned across all the hyperservers in the Hyperfiler. The DHT is protected by a generation number that is monotonically increasing. Every time the content of one DHT slot is changed, or the size of the DHT is altered, the generation number is increased. Pathname-based Remote Procedure Calls always carry the DHT generation number so that the target hyperserver can detect and update any stale DHT used by a client.

An "Extent" is a logically contiguous portion of a hypervolume that stores user data. Any extent in the Hyperfiler is identified via a globally unique Extent ID (EID). An Extent can span up to 4 Mbytes. This implies that accessing files that are 4 Mbytes in length or less only requires a single disk I/O operation.

An "Extent ID (EID)" is an 8-byte number that uniquely identifies any Extent throughout a Hyperfiler. The EID embeds the HID of the hypervolume/hyperserver that owns it, along with information on where the extent is placed within the Data Repository that the hypervolume manages, and the length of the Extent. Specifically, the EID contains the following fields and is handled as an opaque scalar out of its containing hypervolume: (i) The HID of the hypervolume where the extent was allocated; this makes the extent globally unique and addressable within the entire Hyperfiler. (ii) The logical block offset of the starting block for the extent within the containing hypervolume; this directly identifies the logical block index of the starting block within the hypervolume. (iii) The count of logical blocks the extent spans; this lets the cache manager know how much memory must be made available in the cache to read in the extent.

The "File Table (FT)" is one of three contiguous arrays (along with ST and NT) by which the local namespace is implemented on each hyperserver. This array stores the attributes of a file or directory along with the Extent ID for the first extent of each file. Because the Extent ID is global across the entire Hyperfiler, data need not reside within the same hyperserver where its namespace component resides.

As used herein, the term "Hyperfiler" refers to software, developed by Peaxy, Inc., the assignee herein, that runs in a conventional computer hardware environment, and that establishes one or more high-availability mini-clusters, herein called "hyperservers", as components of a distributed file system capable of being dynamically expanded to provide a scalable facility for file storage within a single namespace. More generally, HYPERFILER is a trademark of Peaxy, Inc., the assignee herein, for software that implements scalable high-performance file servers in a wide range of hardware environments, but the term "Hyperfiler" as used herein has the specific meaning recited in the previous sentence.

A "hyperserver" is a cluster of logical computers configured to process cooperatively with respect to a portion of namespace or dataspace or both in a Hyperfiler. (In various embodiments hereof, the logical computers are implemented as Virtual Machines.) Thus the Hyperfiler abstraction groups together as a hyperserver a predefined number of Virtual Machines all operating in concert on a portion of the namespace and/or of the dataspace. The cardinality of the hyperserver defines its redundancy in that each logical computer (for example, each Virtual Machine) of the hyperserver manages the file system in a redundant fashion, implementing redundant hypervolumes. A hyperserver has a composition that may vary over time because individual Virtual Machine members may join or leave the hyperserver because of crashes, loss of connectivity and replacement of lost members. A client interacts with hyperservers to have its requests carried out and need not be aware of the membership of the hyperserver. Therefore, clients address hyperservers via hyperserver IDs that abstract from the IP addresses of the VMs that are members of the hyperserver at any one time.

A "Hyperserver ID (HID)" is a 16-bit ID that identifies one particular hyperserver within a Hyperfiler. It is the way a client identifies the target of any of its requests.

A "hyperserver member (HM)" is one of the logical computers in a cluster of logical computers configured to process cooperatively as a hyperserver. In various embodiments hereof, the logical computers are implemented as Virtual Machines and each HM is a Virtual Machine.

The "Hyperserver Table (HT)" is a global table known to a Hyperfiler and to its clients that describes the membership of each hyperserver in the Hyperfiler in terms of hyperserver cardinality, whether the hyperserver serves the namespace only, the dataspace only, or both and in terms of the IP addresses of the VMs that are members of the hyperserver use. Each entry of the HT is individually protected by a generation number that is monotonically increased every time the membership of the hyperserver it describes changes. This number is forwarded in all RPCs targeting a given hyperserver, which allows the latter to detect possible inconsistencies and to make sure any stale HT entry is updated as needed.

A "hypervolume" is a collection of namespace and dataspace components managed by a hyperserver. It is identified via a Hyperserver ID, shared with the hyperserver that owns and manages the hypervolume.

The "intent log" is a repository of a set of updates to the backing store. Whenever a set of updates to the backing store are needed, they are copied to the intent log, along with the indication of the table to which each relates.

A "logical" computer system can be either a real computer system or a virtual computer system. When a logical computer system is a virtual computer system, the virtual computer system is established by running virtualizing software in a real computer system.

The term "memory" means random access memory (RAM) and auxiliary memory, together with any arrangement, such as paging, that is used to expand RAM or auxiliary memory.

The "Mount" operation in a Hyperfiler makes the client known to the Hyperfiler, retrieves all the data structures needed to let the client interact to the Hyperfiler and makes available the file system tree under the target Hyperfiler directory below a local Mount Point. After the Mount operation has been performed, all accesses to files and directories under the Mount Point are translated into Remote Procedure Call requests to the Hyperfiler, although they still appear to be directed to the local file system. The Mount operation accomplishes a purpose that is similar to what happens when a client performs the mount of a directory on an NFS server.

The "Mount Point" is the pathname of the directory in the local file system chosen by a Client in performing a Mount operation. After a successful Mount operation, all the files visible under the Mount Point are files and directories stored in the target directory of the file system used in the Mount operation.

The "namespace" is the part of the Hyperfiler that manages the hierarchical file/directory structure implemented by a Hyperfiler. The entire namespace is partitioned across the Hyperververs that are members of the Hyperfiler. Along with the file system hierarchy, the namespace component also stores the basic attributes for files, directories and symbolic links, such as ownership information, access permissions, creation and modification dates along with the EID of the first Extent for files and symbolic links.

The "Node Table (NT)" is a data structure that stores the lock for each node, along with either a string or the ID of a string in the String Table when the size of the string exceeds the storage available in the NT entry, as well as indices of the connected NT entries in the Patricia Tree, flags associated to the NT entries and the index of the associated FT entry, if needed. Two entries of the NT are special: Entry 0 acts as a pointer to the root of all the namespaces available. Having this level of indirection may allow implementing snapshotting of the namespace or multiple namespaces in the future. Entry 1 of the NT is the root directory of the POSIX namespace and corresponds to "l".

A "Policy" is a set of rules to be applied in the creation of files or in their processing that entail the assignment of their data components to Storage Tiers and, indirectly, to the dataspace Hyperfilers that implement such tiers. A Policy can determine the characteristics (suffix, parent directory name, owner, . . . ) a file must have to be stored within a given tier. A Policy can also specify time- or event-based operations to be performed via Workflows, such as those needed to migrate files from one tier to another when they become rarely used, or when heavy access is about to occur.

A "primary member" is a hyperserver member that, at a given time, is the authoritative entity for the state of the hypervolume it manages and thus carries out a primary role in the hyperserver. Within a hyperserver, one specific member at a time carries out the primary role. All the other members are secondary members. The primary, just as any secondary, can serve any requests that do not alter the state of the underlying hypervolume (such as read operations) but is also the one member that performs any state-altering requests and coordinates the operations on the Secondaries. Under this arrangement, by the time the request is completed, all the members of the hyperserver reach the same state with respect to each individual request. A primary keeps its primary role until it crashes or is evicted from the hyperserver because of loss of connectivity or other abnormal behaviors.

A "Remote Procedure Call (RPC)" is the network protocol by which a Client requests a service to the Hyperfiler. The RPC is tailored to the functionality needed to be implemented and is synchronous at the File System level. The underlying layers of the protocol take advantage of the parallelism inherent in the hyperserver that is the target of an RPC and exploit it to asynchronously communicate with the individual hyperserver members, when needed. This aspect is hidden from the upper layers of the stack, to simplify the semantics of the calls.

The "passive directory" is a version of the directory, residing on the hyperserver, where its parent directory is hashed, and is present to be properly reported in the listings and traversals of its parent. In the Hyperfiler each directory may have two versions: the passive directory, as just described, and the active directory, which is a version of the directory, residing on the hyperserver, where its own name is hashed, and is the directory used to create, delete, list and access files and subdirectories. Occasionally the active directory and the passive directory may hash to the same hyperserver and therefore collapse into a single directory.

A "secondary member" of a hyperserver is a hyperserver member that can carry out client requests that do not alter the state of the underlying hypervolume managed by the hyperserver. When the state of hypervolume managed by the hyperserver is to be altered, as in the case of a write to a file or of a file creation or deletion, it is the primary member of the hyperserver that issues and coordinates such operations with the secondary members, which carry out such requests as slaves. In case the primary of a hypervolume leaves the hypervolume, one secondary is promoted to cover the primary role.

A "Server ID (SID)" is the number assigned to a hyperserver member (HM) in a hyperserver. Each member receives its SID when it joins the hyperserver and retains it until it leaves the hyperserver or if it crashes. A new HM receives an SID that is unused at that point in time (it could be a previously used SID that was in use an HM that was evicted or crashed). By convention, the lowest SID of an HM is 0, each successive SID is 1, 2, etc. Accordingly, the SID is a small number that is always smaller than the cardinality of the hyperserver.

A "set" includes at least one member.

A "Storage Tier" is a high-level grouping of dataspace hyperservers in the Hyperfiler, based on similarities in cardinality and in capabilities and performance of the storage devices used to implement the hypervolumes they manage. Individual dataspace hyperservers are assigned to Storage Tiers and inherit the tier's attributes.

The "String Table (ST)" is an array made of fixed-length cells that can be aggregated into a contiguous chunk and is used to store strings that do not fit within the Node Table.

A "subset" of a given set optionally may include the entire given set.

A "proper subset" of a given set does not include the entire given set.

A "virtual computer system" (sometimes herein called a "Virtual Machine") is a virtual machine, with attributes including a processor, memory, and storage, implemented in a manner substantially independent of any underlying actual hardware environment.

A "Workflow" is a set of operation orchestrated by a storage system in accordance with embodiments hereof to either carry our specified policies or to conduct requested operations, such as software upgrades of a Hyperfiler, expansions of a Hyperfiler through the addition of new VMs, and so on.

HYPERFILER is a trademark of Peaxy, Inc., the assignee herein, for software that implements scalable high-performance file servers in a wide range of hardware environments. As used herein, the term "Hyperfiler" refers to a particular example of such software, developed by Peaxy, that runs in a conventional computer hardware environment, and that establishes one or more high-availability mini-clusters, herein called "hyperservers", as components of a distributed file system capable of being dynamically expanded to provide a scalable facility for file storage within a single namespace.

The Hyperfiler and its component hyperservers in embodiments hereof offer POSIX access to files and are not meant to support DB-type workloads.

In one embodiment, the Hyperfilers support Linux machines as clients. Other embodiments may be established to support clients of other operating systems such as the Windows operating system provided by Microsoft of Redmond, Wash.

The file storage access protocol used within an embodiment of the Hyperfiler described in detail herein is highly streamlined and based on UDP. Clients using the basic file services need to deploy a dynamically loadable Linux module that interfaces the Hyperfiler. This is a very lightweight client that is minimally invasive and uses extremely limited local host resources.

In addition to the POSIX file system interface, a scalable HTTP/HTTPS interface to access files is also provided for this embodiment.

Below we provide description of the architecture by giving detail of all of main subcomponents. The description of the architecture is provided in the following main sections:

I. The physical underpinnings of the Hyperfiler.
II. Main Hyperfiler Abstractions
III. Operational Behavior
I. The Physical Underpinnings of the Hyperfiler In various embodiments of the present invention, the Hyperfiler is implemented by one or more hyperservers configured to respond to storage requests from a client computer, and each hyperserver is implemented as a cluster of one or more logical computers that operate as hyperserver members (HMs). In turn, in embodiments of the present invention each logical computer operating as a hyperserver member is implemented as a virtual machine (VM) running on a physical computer whose CPU, RAM and network resources are virtualized by Hypervisors such as KVM, VMware, Xen and so on.

The System Management component clusters together HMs into hyperservers that implement a highly available server abstraction. Additionally, the System Management software aggregates hyperservers into the software abstraction known as a Hyperfiler.

Clients of the Hyperfiler run a software component that allows the Hyperfiler file system to be mounted and accessed via traditional POSIX programming APIs. (The "mount" operation is similar in nature to what is done to gain access to an NFS filer.)

Each HM has available storage, CPU, RAM and network resources available in hardware or virtualized by the underlying Hypervisor (if any).

Storage

In order to support the distributed file storage, each HM makes use of the block storage available. This can be implemented in different ways:

HMs can make use of LUNs available through a SAN infrastructure. Note that this need not be, strictly speaking, a SAN. There exist multiple alternatives in addition to actual SANs to support SAN-like facilities providing storage for VMs, such as the storage facilities offered by VMware via its VSAN product or by companies such as Coraid, Nimble, Tintri, etc. etc. Regardless of the specific storage facility adopted, storage at the HM level appears similar to a LUN made available by a SAN. When such LUNs implement some form of redundancy, this type of storage can offer High Availability attributes. Note however, that whereas the underlying LUNs would be redundant and capable of supporting High Availability (HA) at the storage level, unless the server software that manages these LUNs and shows the storage content in the form of files and directories is itself capable of running on redundant HMs, the crash of an HM would compromise access to the data stored in the LUNs the HM manages. Therefore, regardless of the redundancy and HA attributes of the underlying storage, the Hyperfiler must be built in such a way that redundancy in the HMs is supported.

A different approach is the one in which one associates physical storage to the HM(s) running within an industry standard computer and uses the disk drives in the computer as the storage for the HMs. In this case, one could let separate HMs manage each of the drives in the computer. The difference with the previous approach is that in this case the Hyperfiler software must make provisions to support redundancy both in the HMs and in the underlying storage.

The two approaches above are quite different, in terms of practical consequences. In typical embodiments, there is implemented a storage replication strategy across multiple HMs when HMs directly manage physical disk drives in the machine where they run. Clearly, this is not strictly necessary when redundancy and HA are offered by the SANs or SAN-like facilities that supplies the storage resources. When needed, the customer can configure replication by selecting the degree of replication desired (see below). Note that replication is implemented as mirroring, limited to the parts of a storage device that contain active data. This speeds up resynchronization across mirrors and greatly improves the performance even as resynchronization is going on.

HMs are largely storage-agnostic and can support any type of physical media, including SSDs.

Typically any individual HM in a hyperserver manages a couple of separate storage partitions: one devoted to the namespace and one devoted to dataspace. This will be explained ahead in more detail, but one of the basic concepts is that it is possible to place the namespace and the dataspace on physical media that best can achieve the performance the customer requires for a specific deployment. This is better than devoting higher speed devices purely to caching, as this strategy would be ineffective whenever (as in one use case for which embodiments of the present invention are applicable) the set of files being accessed are extremely random.

CPU and Memory

HMs are expected to run on systems that make use of multi-core CPUs. Many of the choices made in the Hyperfiler design take advantage of the processing power of multi-core architectures, by trading off processing for I/O bandwidth as needed.

As for memory, the Hyperfiler is designed to support very different types of loads, within the constraints of the market segments it aims to service. Therefore, the amount of RAM each HM should be allowed to use is a function of the performance desired and of the cost goals for each deployment. However, in general, it is expected that each HM should have available between 1 and 4 GBytes of RAM.

Network

Hyperfilers do not rely on any special types of network connections other than IP over Ethernet. This lowers the costs, allows access to very common technology and avoids the need to manage multiple types of network infrastructure, which again reduces the Total Cost of Ownership (TCO).

The typical Network Interface Card (NIC) available in industry standard servers is perfectly adequate for the job. However, one important caveat is in order: the HMs running within the same box share the CPU cores and the NICs, therefore it is highly desirable for these to be balanced. For example a computer hosting 16 disk drives (and presumably running 16 HMs) should make available no less than one Gbit/s NIC port for every pair of HMs, unless its role is that of a lower tier in the storage hierarchy, where access to the content of the drives is deemed to be infrequent.

Additional Hardware Requirements

The Hyperfiler does not dictate the presence of any other special type of hardware, although it could certainly take advantage of such things as NVRAM.

FIG. 1 is a block diagram of a Hyperfiler in accordance with an embodiment of the present invention. The Hyperfiler 101 is here implemented by a collection of namespace hyperservers 106, 107, and 108 for handling the namespace 104 associated with the Hyperfiler 101 and by a collection of dataspace hyperservers 121, 122, 123, 124, and 125 for handling the dataspace 105 corresponding to the same namespace. In this example, each namespace hyperserver is implemented by two hyperserver members (HMs), and each hyperserver member is a virtual machine (VM). Thus namespace hyperserver 106 is implemented by VM 109 and VM 110, and namespace hyperserver 107 is implemented by VM 111 and VM 112. Similarly each dataspace hyperserver in this example is implemented by three hyperserver members (HMs), and each hyperserver member is a VM. Thus dataspace hyperserver 121 is implemented by VMs 126, 127, and 128. (Other Hyperfilers 102 and 103 are illustrated to show that they can be added to provide even larger-scale storage access when performance of a single Hyperfiler is deemed insufficient.)

The VMs in the hyperservers are established by software running in the series of conventional servers, including those shown as 113, 114, 115, and 116. To provide suitable redundancy each VM in a given hyperserver is implemented in a different physical server. Thus the VMs 109 and 110 of namespace hyperserver 106 are implemented in distinct physical servers 113 and 114. Similarly the VMs 111 and 112 of namespace hyperserver 107 are also implemented in distinct physical servers 113 and 114. As to the dataspace hyperserver 121, its three VMs 126, 127, and 128 are implemented in distinct physical servers 113, 114, and 115 respectively.

It is also apparent from FIG. 1 that the physical servers need not be identical. In fact, for example, servers 113, 114, and 115 are used for tier 1 storage and servers including server 116 are used for tier 2 storage. Finally servers 131 and 132 in this example are cloud-based servers, accessed over the internet by dataspace hyperserver 125, and used for less frequently accessed data, where latencies in access are deemed less critical.

II. The Main Hyperfiler Abstractions

This section builds upon the previous one by describing the main abstractions the system implements and the way they relate to the underlying physical devices.

Hypervolumes and Hyperservers

A hypervolume is an abstraction that builds replicated highly available storage on top of physical storage media and provides a way to address storage devices across the network. Essentially, one can think of a hypervolume as a redundant logical volume of storage implemented across all the members of a hyperserver. (In the special case of hyperservers with a single member, unless the physical storage used is itself redundant at the block level as it is generally the case with a SAN LUN, the hypervolume would offer no redundancy.) (This abstraction is used to partition the storage in a Hyperfiler into more manageable pieces that are part of the integrated view the system offers. Each hyperserver accesses and manages a dedicated hypervolume through its HMs.

Even in the case of redundant block storage, as in the case of LUNs in a SAN, a hypervolume can build extra redundancy, although this is not necessary and would presumably result in a waste of storage resources.

When a hypervolume is built by replicating the content of a physical volume across multiple HMs, through its HMs the hyperserver makes sure that all the replicas evolve in lock-step.

A hypervolume is a repository where two separate components of the Hyperfiler may reside. They are:

The namespace component.
The dataspace component.

Note that at least one of the two components must be part of the hypervolume. However, it is not necessary for both components to be always present and this allows a high level of flexibility in the operation and management of the Hyperfiler.

Hypervolumes and hyperservers go hand in hand because a hyperserver is the active manager of a hypervolume and a hypervolume is the potentially redundant storage resource for the exclusive use of a hyperserver. So, in order to change the state of a hypervolume (create or delete files or directories or write to files), a client must send appropriate requests to a hyperserver.

The system assigns integer identifiers to each hypervolume/hyperserver (Hypervolume ID, or HID) and all the addressing of such components is performed through such identifiers. (The same ID identifies a hyperserver and its hypervolume.) This allows decoupling the communication aspects from the knowledge of the physical members of a given hypervolume/hyperserver so that the loss of one HM in a hyperserver is always transparent to the clients trying to access the data or metadata. Moreover, as HMs are replaced because of malfunctions or other reasons, the clients of the service are kept unaware of all of this, unless catastrophic losses occur that entail the unavailability of the entire hyperserver. (Events of this nature are not expected to occur because of the high degree of redundancy the Hyperfiler provides.)

The number of HMs in a hyperserver is called the "cardinality" of the hyperserver. (This is also an attribute of the underlying hypervolume, which has as many replicas as the cardinality of the hyperserver to which it belongs.)

It is chosen when the hyperserver is initially configured. It can be changed at a later time. However, the cardinality is always a small number in the 1-4 range, depending on the level of redundancy one chooses to implement. Note that each individual hyperserver can be configured to offer a different cardinality.

Each HM is assigned a Server ID (SID). Because, by convention, the first SID assigned is SID=0, the SID is a small number that is always smaller than the cardinality of the hyperserver. Each member receives its SID when it joins the hyperserver and retains it until it leaves the hyperserver or if it crashes. A new HM receives an SID that is unused at that point in time (it could be a previously used SID that was in use an HM that was evicted or crashed).

Within any hyperserver, one member is always chosen to be the primary. This member has special status because it arbitrates any requests that entail a change of state in the data or metadata.

When the hyperserver primary crashes or goes down for any reason, another member of the hyperserver takes over the primary role and a new HM is automatically brought in by the System Management software, to replace the missing member HM, if available. Selection of which hyperserver member will take over the primary role does not require an election process, because the choice is deterministic and based on static attributes of the individual members. If no HMs are available to take over the primary role, the hyperserver continues operating in degraded mode.

Note that a secondary HM that becomes the primary continues to retain its SID.

An HM can only perform the following transitions:
From non-member to primary or secondary member.
From secondary to primary.
From primary or secondary member to non-member. This last transition occurs automatically if the member crashes or can be caused by an eviction of the member caused by the detection of its inconsistent state.

Note that in no circumstance can a primary relinquish its role to become a secondary unless it is evicted or crashes.

When a client sends a request to the Hyperfiler, it is either a namespace request or a data request. namespace requests are those that involve a pathname and must be sent to the hyperserver that is in charge for that pathname. The mapping between the pathname and the relevant hyperserver occurs via the mechanisms described ahead. Data requests are self-identifying because they operate on the basis of a handle that contains the HID of the target hyperserver.

There are two types of incoming requests into a hyperserver:

Read-type requests: after any requests in this category have been performed, the state of the data or the metadata in the hypervolume has not changed. Requests of this type include file reads, directory listings, retrieval of file metadata and so on.

Write-type requests: requests in this class cause alterations to the data or metadata in the hypervolume. Requests in this category are file writes, file creations, deletions and renames, etc. etc.

Any individual member of the hyperserver can handle any read-type requests. The requests sent to hyperserver are distributed among its members, so as to partition the load. The system makes sure that it is always the same member that processes requests pertaining to a particular file extent, so as to exploit any local caching of the file data. The system accomplishes the distribution of the read-type requests algorithmically in the client, on the basis of elements available to the client: the pathname for pathname-based requests and the ID of the file for ID-based requests.

In addition to serving read-type requests, as all the other members do, the primary is also in charge of coordinating the processing of write-type requests. The primary must make sure that all members are still synchronized when such requests have been completed and must be able to either repair and resynchronize or to evict those members of the hyperserver that were unable to comply or to be resynchronized. Thus, the primary returns a positive acknowledgement to the client only when all the members have completed the execution of the request successfully. Alternatively, and depending on the way the system is configured, the primary may return an acknowledgement when a majority of the members of the hyperserver have carried out the operation. In the latter case, the members that were unable to complete the transaction would be properly labeled and either the transaction is completed in a delayed fashion or the member is evicted from the hyperserver.

Since a Hyperfiler aggregates a variable number of hyperservers and hyperservers replicate the same content, efficient Hyperfiler operations only depend on the efficient interactions within a given hyperserver. In fact, the amount of communication needed to coordinate a write-type request (the only type that needs coordination, as it alters the hypervolume state) is minimal. The consequence is that the Hyperfiler can expand indefinitely, because the promptness with which requests are carried out is not a function of the overall Hyperfiler size, but only a function of the hyperserver size, which is inherently small. Therefore the Hyperfiler behaves as a federation of hyperservers and performance scales linearly with the Hyperfiler size.

ID-based requests for file operations act on file segments (extents) stored within hypervolumes and identified via unique IDs that include the HID. Therefore, each such Extent ID is always globally unique across the entire Hyperfiler.

When a drive or node fails and the associated HM fails with it, System Management brings in a replacement HM, if available. This entails replacing the mappings between HIDs and the underlying IP addresses, used to communicate with the hyperserver members. The data stored in the surviving members of the hypervolume is then replicated to the new HM that joins the hypervolume as a new member (unless the data itself already relies on a SAN or a SAN-like facility which offers intrinsic storage redundancy). Once the new member is synchronized with the rest of the hyperserver, it starts servicing incoming requests, along with its peers.

The ability to assign different cardinalities to different hyperservers within the same Hyperfiler has some advantages because the cardinality defines the level of replication the associated hypervolume provides. By choosing which hyperserver (and hypervolume) hosts a given file, the system allows to assign higher or lower intrinsic redundancy to the file data. This lets customers pick and choose files that should be granted higher or lower levels of redundancy and therefore permits optimal allocation of the storage available on the basis of the importance certain data has for the customer. Allocation to a desired level of redundancey can be performed according to the directory where a file resides or to other criteria, such as on the basis of file suffixes. Alternatively, in a simplified embodiment, the cardinality of all the hyperservers is restricted to a single Hyperfiler-wide value.

The Network Layer

The network layer is responsible for implementing the Hyperfiler file storage protocol. The protocol is based on UDP rather than TCP. This has some advantages:

It allows communications to be streamlined and very efficient.

It does not rely on connection-oriented interactions. This is advantageous because it reduces the overhead, simplifies the implementation of end-to-end semantics and is better to deal with network interruptions and with cases in which the entity that replies to a request differs from the one to which the request was sent. (For example, this is very useful to cope with errors in a hyperserver member that was handling a request when the latter could be successfully completed by a different member.)

On the other hand this also requires a Remote Procedure Call (RPC) layer to be implemented on top of the pure transport, to properly deal with the sequencing of messages, the guaranteed delivery, non-duplication, etc. etc.

The upper layers of the Hyperfiler file system deal with hyperservers in terms of synchronous requests and, as mentioned in the previous subsection, have no need to be aware of the IP addresses associated to the hyperserver members, nor of the cardinality of the individual hyperservers. Nevertheless, the lower layers of the network facility deal with communication in terms of unicast messages to specific IP addresses that are members of a hyperserver and implement synchronous network semantics by using asynchronous mechanisms underneath. This simplifies the logic in the distributed file system layers while relying on the flexibility and efficiency of asynchronous and parallel network I/O at the lower levels.

The file system layer that invokes the network layer can specify which of the members of a hyperserver should be sent any given message. This can be done in two ways, depending on the operation to be accomplished:

When a client desires to send its request to the primary, a secondary, all the secondaries, or all the members of a hyperserver, it is allowed to specify any of the above cases.

Alternatively, on the basis of a bitmap, the client can specify whether the target of a given request is one or more of the members. Since each member receives an internal hyperserver index that is retained as long as the member belongs to the hyperserver and is only reassigned to a new member when the member that was using that index leaves the hyperserver membership, this unequivocally identifiers the member of interest. Also note that since a bitmap is used for this purpose, only one, some or all the members can be addressed this way.

This entails that each request sent to the network layer includes a flag that identifies which of the two addressing modes is used for that request and, based on the former, which of the members are targeted according to the format chosen.

Also note that any replies received by the requesting client are identified with the index of the members that replied. Note that since it is the network layer that maps the synchronous higher-level request into asynchronous requests to the chosen addressee(s), in case there are multiple replies, this same layer assembles all such replies into a single aggregated reply. Each segment of the reply carries the index of the member that replied (and its role).

The network layer also implements server facilities within the clients of the Hyperfiler. The services offered on the client side are very minimal and simple, yet are useful to validate whether clients are still active or whether certain objects they acquired are still in use and enhance the flexibility of the system.

In a Hyperfiler, the file system layers carry out client requests in the following fashion:

A client mounts the Hyperfiler namespace to a local mount point (a local directory that is empty and under which the client will see and will appear to access the namespace of the Hyperfiler). The mount is addressed to a Hyperfiler-wide well-known entity that is responsible for the mounting. Note that this can be a replicated entity to prevent a single hyperserver from being flooded with requests at the time the system starts. When the mount is performed, the client receives from the Hyperfiler the data structures that describe the composition of the Hyperfiler. These include the hash table that maps hash buckets to hyperservers, the number of hyperservers in the Hyperfiler and the tables that describe the membership of each hyperserver.

When a file system operation is needed, the file system layer in the client sends an appropriate request to the lower layers. The nature of the request determines the type of interaction needed. A name-related request, such as a file open, causes the pathname to be hashed to a 64-bit number. The number is then used to address one particular slot in the hash table within which a Hyperserver ID is stored. This gives the lower client layers the indication of which hyperserver to whom the client should address its request.

The request is then sent to the network layer to be addressed to the specified hyperserver. The network layer converts the Hyperserver ID to the IP address of one of its members and sends the request to the appropriate hyperserver member. It waits for a reply and when this occurs, the reply is forwarded to the upper layers of the file system.

In all this there are multiple situations to be considered. First of all, the Hyperfiler evolves over time. This means that the number of hyperservers can grow, the count of member HMs in a hyperserver can change, HMs can also crash and be replaced. All this may cause changes to the hash table, as well as to the composition of each hyperserver. For this reason, the hash table and each table that describes a hyperserver has an associated and monotonically increasing generation number. Every time the hash table is modified, this number is bumped up. Any RPC carries the generation number for the hash table used and the generation number for the hyperserver to which the RPC is directed. This allows the entity at the receiving end to react to any request carrying an obsolete generation number by informing the client that it needs an update. This allows the hash table and the hyperserver composition to be propagated as needed, in a very asynchronous and gradual fashion.

The System Management component of the Hyperfiler is responsible for maintaining the hash table and its generation number as well as the hyperserver configurations with their individual generation numbers.

The Hyperfiler Namespace

The namespace of a system in accordance with various embodiments hereof is fully distributed. Hyperfiler clients are able to identify the HID of the hyperserver that manages a given file or directory on the basis of the file's or directory's pathname. This allows any client to know the hyperserver to which it needs to talk, in order to access any file system object. The mapping of pathnames to HIDs is accomplished via hashing. Essentially each Hyperfiler client performs a "mount" operation of the Hyperfiler on a directory that is local to the client itself, much as one would do for NFS. At the time of the mount, the client retrieves a certain amount of Hyperfiler information, including two tables, the Hyperserver Table (HT) and the Directory Hash Table (DHT).

The Hyperserver Table (HT) lists all the hyperservers available in the Hyperfiler, along with their composition. This provides the mappings between the HIDs and the IP addresses of the members of the hyperservers. The underlying network layer is the primary user of this table that allows Hyperfiler clients to interact with hyperserver members. As mentioned earlier, a hyperserver generation number protects each hyperserver configuration. This allows keeping track of configuration changes within each hyperserver. Since the network layer automatically inserts this generation number within each message sent to the hyperserver, the latter is able to diagnose any inconsistency in generation number and can thus alert the client that it needs to refresh its copy of the HT. Note that entries in the HT change whenever alterations to the Hyperfiler are applied, for example when HMs crash or become inaccessible, or if new HMs are attached to the Hyperfiler.

The Directory Hash Table (DHT) maps directories to HIDs. From a conceptual point of view it is simply an array of slots each containing the ID of a hyperserver. The mapping is many-to-one, meaning that in general multiple slots will point to the same hyperserver. When a client needs to resolve a pathname, it hashes the absolute pathname on the Hyperfiler (up to and including the parent directory of the file system object of interest) to one entry in the DHT. This entry provides the HID of the hyperserver that is in charge of the directory and to which any requests for objects in that directory should be sent. The DHT is itself protected by a generation number, to allow the detection of any inconsistencies between the Hyperfiler state and that of its client. Therefore such inconsistencies can be repaired on the fly, as soon as they are detected and they are not dangerous because they can be detected at the time when the DHT entry of interest is being used. Due to the nature of hashing, a single DHT entry maps multiple directories. Also, the DHT is expected to contain more entries than the HT so that multiple DHT entries can point to the same hyperserver. The idea is that a ratio of 100:1 should exist between the number of DHT slots and the number of hyperservers. This allows the retargeting of specific entries (and of the associated directories) from one hyperserver to another, for example, to relieve bottlenecks or when a redistribution of the DHT entries across hyperservers is needed.

Note that both tables are sensitive to the number of hyperservers in a Hyperfiler. Since this number can dynamically vary, the tables need to be updated when appropriate. On the Hyperfiler side, the HT is updated every time a change in the composition of a hyperserver occurs. On the client side, this is only needed at the time a client is using a hyperserver whose generation number has changed.

The DHT can be updated when new hyperservers are added to the Hyperfiler. Note that this is not mandatory, in the sense that the Hyperfiler can continue to carry out its function, even if, after new hyperservers are added, the DHT is not updated. In this case, the new hyperserver would still be able to store data files but would not participate in the distribution of the namespace. Note that this could be a transient state (in the case of the top tier hyperservers), but could be a permanent state for lower tier hyperservers (that only store data files).

The DHT must also satisfy one important property: even when it is expanded, the hashing scheme must be such that the HID retrieved via hashing before the expansion must be identical to the HID retrieved after the expansion, unless after the expansion the table entry is deliberately changed. To make this clear, let's assume that by hashing a given directory name the HID retrieved from the DHT before the expansion is N, then if the DHT is expanded in size, after the expansion is completed, the same directory must still yield N. Note, however, that after the table expansion is completed, the system is allowed to redistribute the HIDs across the entries, if needed, to provide a more uniform distribution. This however, also entails moving the directories previously managed by the hyperserver being replaced to the hyperserver that is taking over. So, if we retain the mapping with the DHT expansion, the operations that require the moving of directories and the active involvement of the hyperservers in this only need to be performed when certain DHT entries are replaced.

Storage Classes

The counterpart to the namespace that deals with metadata and pathnames is the actual storage infrastructure used to store the customers' files.

Because of the properties of hyperservers, as a Hyperfiler is configured and expanded, it is easy to configure hyperservers that create separate Storage Classes that can be identified by the cardinality and storage properties of the hyperservers that are part of the class. Thus, it is possible to have at one extreme hyperservers belonging to High Redundancy Storage Classes in which, for maximum protection, replication is performed across 3 or even 4 members and, at the other extreme, No Redundancy Storage Classes that could provide no replication at all and would be used only for transient data or data with modest intrinsic value. Likewise, it is possible to configure hyperservers and Storage Classes with no redundancy across HMs but with some degree of internal redundancy that increases resiliency but does not implement high availability. (Hyperservers with cardinality set to 1 (no redundancy), whose hypervolume is made of a RAID set, can accomplish this. In this case there is resiliency against the loss of one or more drives in the RAID set (depending on the configuration) but that provides no protection against loss of availability during the crash of the physical or virtual device that supports such hyperservers.)

Storage Classes can also be based on the kind of drives in use. For example, a customer might want to have Hyperfilers that use both SATA and SAS drives, in order to devote the SAS drives to data that needs to be better protected. Moreover, a Storage Class could in fact interface an external Object Store for low cost storage of infrequently used data.

When a new file is created, the namespace of the Hyperfiler chooses the appropriate Storage Class using configuration rules that assign Storage Classes to files on the basis of the directory where they reside, the suffix in their name and so on.

The Hyperfiler has a built-in mechanism that can migrate files across Storage Classes by scanning metadata and verifying whether each file was accessed within a customer-selected time window. Customer-chosen policies can then migrate the files that have not been accessed recently to lower Storage Classes, with lower availability and/or higher access times. This would be done automatically, would have no impact on the namespace because the pathnames of such files would be completely unaffected and the scanning would be performed without any actual disk I/O because it would only impact the namespace.

The Namespace Abstractions

The namespace is at the heart of the Hyperfiler. The distributed nature of the namespace is the key to the linear scaling of the Hyperfiler because both metadata and data are fully distributed.

The design of the namespace revolves around a number of important observations that are not part of more traditional file system designs and that make sense because of the relative performance and capability of the components of a modern server:

The network bandwidth and latency offered by modern NICs compare well with or exceed the characteristics of local hard drives. Moreover, the maximum number of I/O operations per seconds a hard disk can sustain has not changed much in the last several years and is still limited to about 100 per drive.

Current multi-core CPUs allow to trade off computational power for storage and I/O operations.

The namespace itself can be completely decoupled from the dataspace. Doing this allows placing the namespace on devices that can be very different in terms of performance attributes from the devices where the dataspace is stored. This may be important to insure efficient and fast pathname lookups, regardless of the access time to the data store.

The amount of RAM available in a computer or an HM normally exceeds 1 GByte. This allows new ways to structure the file system metadata.

Note that a Hyperfiler can be configured with a single hyperserver. In this case all the namespace and the dataspace is managed by the only hyperserver. The resulting namespace is typically available to be accessed across the network. The architecture, however, can also efficiently implement a local file system because the abstraction it supports allow this.

However, a Hyperfiler is generally expected to span multiple hyperserver. In order to accomplish this, both the namespace and the dataspace are distributed across hyperservers. Let us first discuss how the names are distributed across hyperservers and then how the local portion of the namespace is handled within a hyperserver.

Distribution of the Namespace Across Hyperservers

The distribution of the namespace across hyperservers is performed in such a way that any client is immediately aware of the hyperserver to which it should send its request. The distribution criteria rely on the following considerations:

The ability to efficiently list the content of a directory must be retained in a distributed namespace and performance should not be inferior to that of a centralized namespace.

The ability to create new components in the namespace relies on the ability to verify whether name conflicts exist and this must be supported efficiently.

The presence of a file in a directory should not imply that the data file itself is managed by the same hyperserver that serves its parent directory. This is important to avoid bottlenecks, allowing files and directories to be distributed across hyperservers.

File system object names are distributed across the Hyperfiler on the basis of the file system object's parent directory. This scheme is similar to the one adopted in Kosha and hashes directory names to different hyperservers. See Ali Raza Butt, Troy A. Johnson, Yili Zheng, and Y. Charlie Hu, "*Kosha: A Peer-to-Peer Enhancement for the Network File System*", in Proceedings of the ACM/IEEE SC2004: High Performance Computing, Networking and Storage Conference, Pittsburgh, Pa., Nov. 6-12, 2004. However, a major difference with Kosha is that the hashing applies to any individual directory, rather than to subtrees. Thus, it is likely that a directory and its child subdirectory will be managed by different hyperservers. Directories are directly represented within the namespace. So they do not require a separate storage area in the dataspace used for files.

Note that by looking at a pathname, a client may not know whether the pathname refers to a file or directory. In any case, it will make use of the parent directory to identify what is the nature of the leaf component in the pathname. If it is a file, then the hyperserver that manages the parent directory is where all the inquiries should be sent. If the leaf component is a directory, then its parent stores all the relevant attributes for the directory and the parent's hyperserver should be the target of the request. Yet, requests to list the content of the directory need to be sent to the Hypeserver that manages the directory. Essentially directories exist in multiple incarnations within multiple hyperservers:

The directory information is stored within the hyperserver that manages its parent. This is the authoritative hyperserver for the directory.

The hyperserver that manages the directory itself is the authoritative hyperserver for the content of the directory and all the requests for anything in that directory should reach this hyperserver.

Shadow copies of any directory can exist within hyperservers, as needed to guarantee the namespace connectivity.

To exemplify this, consider the case of a directory named "/first/second/third". Let's assume that "/" (the root of the entire Hyperfiler) is hashed to hyperserver A, "first" is hashed to hyperserver B, "second" is hashed to hyperserver C and "third" is hashed to hyperserver D. Now, if one wants to request the attributes of "/first/second/third", then the request should be sent to C. On the other hand, requests to list the contents of "/first/second/third" or to access any file under "/first/second/third" should target hyperserver D. In addition to this, if there exists a directory named "/first/second/third/fourth/fifth", any hyperserver that must be able to process requests involving "/first/second/third/fourth/fifth" must also contain shadow copies of "/first/second/third/fourth".

Persistence of the Namespace

The virtual memory-based namespace clearly requires to be persistent, meaning that its content must in fact be backed up to disk, so that any modifications performed to the file metadata in virtual memory would be available even after a crash. This is indeed the case for the Hyperfiler, which makes use of an intent log facility to provide this while minimizing the impact on system performance. Note that the intent log is transactional and allows the namespace to be always up to date with respect to the last completed namespace transaction. In case of crashes, the restart of a hyperserver entails applying the last transactions logged to the persistent copy of the namespace on disk and the initialization of its in memory view to the latest completed transaction.

The namespace in the Hyperfiler is decoupled from the Data Repository (reference [2]) as it has no need to store its data within the latter. This decoupling simplifies the design of the file system in these embodiments and minimizes the amount of data in the namespace. Thus it makes the latter suitable for storing it in RAM.

The Key Data Structures

The collection of pathnames in the Hyperfiler's namespace is implemented as a Patricia Tree, namely as a kind of ordered tree data structure. Specifically, this tree-like data structure that has some very important attributes:

It accomplishes fairly fast searches that do not depend on the size of the tree but rather on the size of the string being looked up (a pathname in the Hyperfiler).

It is fairly compact in that it groups together items with a common stem.

It keeps its entries in sorted order.

In the worst case any individual Patricia Tree node has no more than 256 children, which provides an automatic mechanism to prevent a tree structure from collapsing into something that resembles a linked list. This has a major positive performance impact.

The Hyperfiler Patricia Tree is made of fixed-size nodes that keep basic information on the nature of a node, including the type of node (whether it is an internal node needed to assemble the Patricia Tree, rather than a file system node such as a file system file or directory), the string associated with it, the lock needed to operate on the node and its children, pointers to the child and parent node and so on.

If each node in the file system had to be able to store a string of arbitrary length, along with file attributes (like permission, ownership information, dates and extent IDs), it would have to be a large data structure in which many nodes would not use some of the fields. For example, internal Patricia Tree nodes have no need for file attributes. Directory nodes do not need extent IDs because all of the information associated to them is inside the Patricia Tree, rather than in the Data Repository, and so on.

To best cope with this, the local namespace on each hyperserver is implemented in terms of three contiguous arrays of fixed size entries:

The File Table (FT)—this array stores the attributes of a file or directory along with the extent ID for the first extent of each file. As explained in reference [I], this ID is global across the entire Hyperfiler so that the data need not reside within the same hyperserver where its namespace component resides.

The String Table (ST)—this array is made of fixed-length cells that can be aggregated into a contiguous chunk and store strings that would not fit within the Node Table.

The Node Table (NT)—this data structure stores the lock for each node, along with either a string or the ID of a string in the ST when the size of the string exceeds the storage available in the NT entry, indices of the connected NT entries in the Patricia Tree, flags associated to the NT entries and the index of the associated FT entry, if needed.

Two entries of the NT are special:

Entry 0 acts as a pointer to the root of all the namespaces available. Having this level of indirection may allow implementing snapshotting of the namespace or multiple namespaces in the future.

Entry 1 of the NT is the root directory of the POSIX namespace and corresponds to "/".

Any NT entry can be associated with:

No entries in the other tables, if the associated string fits within the entry and the entry has no associated FT entry, as in the case of an internal Patricia Tree node or of a directory that is just an intermediate component of a pathname, as long as either has a short associated string.

One entry in the FT, if this is a file or directory with a short string.

One or more contiguous entries in the ST, if this is an internal Patricia Tree node or a directory that is just an intermediate component of a pathname and the string has a capacity that exceeds that of a node.

One FT entry and one or more contiguous ST entries, if this is a file or directory with a string that exceeds the capacity of its NT entry.

Note that the namespace server in each HM runs as a multi-threaded process that also runs the associated Data Repository (if present). Synchronization among the threads is needed in accessing the namespace and it is desirable to make use of read-write locks for this because they would allow shared access to the Patricia Tree nodes that are not being modified while exclusive access is limited to the nodes being updated. However, the name of the game here is that of having compact data structures for the FT, ST and the NT. If each lock required many bytes, the size of the NT would grow considerably and this would limit the possibility of keeping it in RAM. Therefore, threading facilities used in the Hyperfiler implement read-write locks that have a small memory footprint.

Moreover the locking algorithm in traversing the Patricia Tree is such that for read-type operations each node is locked in read mode and its parent is unlocked when that of its child has been acquired. This limits the locking to two levels and performs it in a hierarchical fashion so that the upper nodes in the Patricia Tree become available as the hierarchy is being descended. This minimizes the contention between readers and writers and avoids deadlocks because this induces ordering among the locks that eliminates one of the four necessary conditions for a deadlock (circularity).

For write-type operations a similar algorithm is applied, except for the fact that when the parent of the node to be modified is reached, it is locked in write mode and kept locked until the namespace modification is completed.

Note also that by locking a Patricia Tree node, the FT and ST entries associated with the NT entry (if any) can be operated upon, without possible conflicts with other threads.

Separate mutexes are used to allocate and deallocate entries within each of the tables that are part of the namespace, to avoid contentions on the free lists.

Persistence and the Intent Log

Persistence is of paramount importance in a file system, and the namespace Patricia Tree must be persistent. Having it completely RAM-based does not accomplish this. For this reason, each of the tables described earlier has a file as backing store to which any changes are written and from which the content of the table is read on restart.

In the namespace each entry in the NT, FT and ST includes a Cyclic Redundancy Check (CRC) code. This is computed every time an entry is modified. These codes are checked when the entries are read back from disk, to protect the key namespace data structures from bitrot and from rare, but possible, undetected disk read errors that, at the scale at which the Hyperfiler is meant to operate, are not negligible.

Considering the small size of each of the table entries, write operations could be extremely expensive, as they could require lots of random seeks within the backing files and therefore take several of the available I/O operations a drive can deliver.

For this reason, all updates are performed by using an intent log. The latter is implemented by memory-mapping a fixed size area of memory (this is currently set to 1 Mbyte). Whenever a set of updates to the backing store are needed, they are copied to the intent log, along with the indication of the table to which each relates. The updates for a single operation are linked together. The thread performing the updates (the hyperserver primary) asynchronously pushes the linked changes to the intent log; then it pushes the updates to the secondaries. If synchronous behavior is requested, the thread waits for the secondary updates to be completed and then waits for the intent log to be done. If, on the other hand, asynchronous updates are OK, the thread only needs to wait for the secondary updates to be received before completing the operation by releasing the write lock held so far.

The intent log is expected to be mapped to a contiguous file and therefore the list of updates, albeit targeting final random offsets in the actual backing files can instead require no intermediate seeks. Since new updates are appended to an initially empty intent file, when each mapped page is full it gets flushed out asynchronously, which makes the update persistent. If synchronous I/O is requested or the caller performs an 'fsync( )' call, the acknowledgement to the client only occurs if the portion of the intent log of interest is committed to disk. Therefore, the update is on stable storage by the time the acknowledgement is sent back. As soon as the end of the intent log is reached, a new one is created for incoming updates while a service thread asynchronously starts extracting the updates from the intent log and committing them to the actual backing files. When this is finished, the intent log is discarded. If a crash occurs, on restart the initialization of the namespace entails the processing of all the intent logs still in existence so that the updates are propagated to the backing files. Only when all the outstanding intent logs have been processed and deleted and the backing stores updated, they are read into the three arrays (the FT, the ST and the NT) that make up the namespace data structures in memory.

Further Observations on the Backing Store and the Intent Log

Alternatives to the above scheme that is the target for the first release are explained in this subsection.

At this point it should be clear that the backing store (the three files that replicate the content of the NT, ST and FT) are only used when a hyperserver member is restarted, in order to have a fully populated namespace.

Updating the backing store from the intent logs causes a bunch of seeks to occur on disk, in order to update the individual table entries. This is undesirable as it reduces the number of I/O operations a disk can carry out to deal with direct client requests. So a good strategy to update the backing store can be that of delaying the updates from the intent log to the files to periods of time when the number of disk I/O operations being performed is below a given threshold. Clearly, it is necessary to guarantee that not too many intent logs are kept around, because this number could potentially grow indefinitely and use disk space beyond what is reasonable. So, some form of back pressure must exist to avoid delaying the updates for a very long time.

On the other hand, it is also possible to perform some consolidation of the intent logs. One could keep bit maps of the table entries that have been undated. These bit maps could be set to 0 initially. Then one could scan the intent logs backwards and set the update bit for the bit maps that are to be updated. When an entry update is found in the log being scanned, if the update bit for the entry is already set, the entry needs no further updating because it was already updated with a subsequent version of data. Therefore that update entry can be purged out of the consolidated log. The process would continue until the older intent log has been processed. This scheme would allow the periodical collapse of multiple intent logs into one that has no stale entries.

Finally, it is also possible to do away completely with the individual backing store files. In fact, one could simply reach the conclusion that since it's only at the time of a restart that the RAM tables need to be read in from disk, this could be done by reading directly from the intent logs and periodic consolidation of the logs could be performed, in order to limit the amount of storage used for them, which otherwise, in the presence of update traffic would keep growing.

By the way it is also possible to imagine a slightly different approach for the intent logs such that a single log file is used, but periodically subsequent sections of it are memory mapped to append new updates. This would reduce the count of intent logs. The larger file could be subject to consolidation with a scheme similar to the one discussed earlier, to prune out stale updates.

This is a bag of tricks out of which we can evolve the initial scheme for managing the persistence of the namespace, on the basis of actual need in future Hyperfiler releases.

Updating the Secondary Hyperserver Members

Primary and secondary HMs generally act independently and process different read-type requests. However, write-type requests are coordinated by the primary that performs the local changes and, if successful, before replying to the requesting client makes sure the state of the secondaries is consistent with the primary.

Because of the asynchronous behavior of the processing among the hyperserver members and of the multitude of threads running within each member, if the primary just sent the write-type requests it receives to its secondaries they would be handled differently and would likely yield results that would be functionally equivalent, yet would cause different members to use different entries for the various namespace tables.

This by itself would not be catastrophic, yet would cause the verification and restoration of consistency across members much more complex. It also has another consequence. The files the namespace points to in the Data Repository need to point back to their namespace components. This allows further consistency checks to be performed between the namespace and the dataspace and garbage collection to be available to correct orphaned data files. If the namespace guarantees that a given file (on any of the members of the data side hyperserver) is always connected to the same NT entry on any member of the namespace hyperserver, the data files can just store the index of the NT entry. Otherwise, the data files should store the index of each of the NT entries for each of the members of the namespace hyperserver or should store a variable-length pathname for the component (which, by the way, would have to be changed every time a rename that affects the pathname occurs).

To avoid all the above complications, the Hyperfiler's namespace relies on having the same table entries in the namespace to be used for any given file system object on any of the namespace hyperserver members. This however requires changes to the way the execution of requests on secondaries should be handled because, regardless of the asynchronous execution of the client requests, the table entries to be allocated need to be the same. It is also an opportunity to streamline such secondary operations because the secondaries need to be told which way they need to alter the table entries to reflect the state of their primary.

One thing that is important to note is that ongoing read-type requests must be able to flow freely as the write updates from the primary are applied. For this to work successfully, the primary must send an indication of the NT entry that must be locked in exclusive mode to perform the update. This would prevent any incoming read-type requests from getting access to data structures that are in a transient state. For the rest, the primary only needs to send to each secondary the update list generated and committed to its local intent log as this list is the exact recipe to replicate what was done on the primary.

There is one more slight complication: since even updates are performed by concurrent threads on the primary, it is desirable that such updates be performed in the same sequence on the secondaries. For this reason both the primary and the secondary run a sequencer: a module that keeps track of the order in which operations are performed. It is used and operates in different ways on the primary and on the secondary:

On the primary, at the start of each update, after the exclusive NT entry lock is acquired, the updating thread requests and saves a sequence ID. This is a 64-bit number that the sequencer generates monotonically (with wrap-around). The only excluded value is 0. The primary acquires this number and saves it, in order to send it to the secondaries along with the update list.

On the secondary, the thread that receives an update request asks its local copy of the sequencer to approve its sequence ID. If the previous sequence ID has been processed already, the sequencer allows the thread to proceed. Otherwise the thread waits until the previous sequence ID has been fully processed. After the thread has received approval for processing its sequence ID, it acquires the exclusive lock for the NT entry of interest and proceeds updating all the table entries in the proper sequence. When everything is updated, the thread tells the sequencer that it is done with its sequence ID, which would allow the next update to proceed. (A facility is available that allows a thread to discard a sequence ID in case the operation it acquired the ID for had to be aborted.)

One important aspect in the execution of updates in the primary versus the secondaries has to do with the fact that all the allocation choices are done in the primary and the primary does this by grabbing the next entry available in each table out of a free list that the primary maintains. The free list links together the entries of each table that are not in use. On the other hand, the secondaries have no need to choose table entries to allocate because the indices of the ones to use are in the update list each secondary receives. Hence, the secondaries have no need to maintain their own free lists.

Let us summarize the asynchronous operation of the hyperserver members in dealing with updates to the state of the namespace. The members of a given hyperserver are configured so that subcomponents of the namespace, namely file table (FT) entries, string table (ST) entries, and node table (NT) entries, with the same identifiers are allocated or deleted for the same operation among the members of the hyperserver. Even though the subcomponents are used with the same identifiers, the members of the hyperserver are configured to run asynchronously in handling update requests—that is, any requests that cause an update of the state of the namespace. To enable asynchronous operation of the members, update requests are assigned a sequence number by the primary member, and these sequence numbers are used to provide order in the manner in which updates are performed by the secondary members. A write lock is applied, by the primary member, using the file system node that is the parent of the entity (file or directory or symbolic link) to be deleted, created, or modified. Then the primary member performs the local update. Then, it assembles a packet that includes the sequence number, the list of locks to be acquired, and the new content of the namespace entries to be updated; it then sends the pack to each of the secondaries. On receiving the packet, each secondary waits for the sequence number to become current, and then it applies the write lock specified in the packet to its corresponding component of the file system node, and then it performs the local update. Finally, the secondary give an acknowledgment to the primary. At this point, the secondary can advance to the next sequence number, so that other concurrent updates can be performed. In a case where the update includes a delete followed by an overwrite, then the primary transmits only the overwrite, since the delete is redundant.

On receiving the acknowledgment from each of the secondaries, the primary removes the write lock, and at that point the primary replies to the requesting client, according to one the following protocols: Either (1) the secondary acknowledges to the primary when the update has been performed and is in stable storage, or (2) the secondary acknowledges to the primary when the update has been performed but without waiting until the update is in stable storage, or (3) the secondary acknowledges to the primary when it has received the primary request, but before the secondary actually carries out the update. The determination whether to use a given one of these protocols is made according to a desired tradeoff between performance and reliability.

Some important consideration stem from the above:

Since only the active primary is then the member that needs to use and update its free lists, they are only relevant for the running primary.

There is a hierarchy between the tables in which the NT has a main role, whereas the FT and the ST play ancillary roles. In other words, entries in the FT and the ST cannot be allocated unless they are referenced by one NT entry.

Entries in the NT are only in use if they are referenced within the NT by another entry.

The tables are set up in such a way that the free lists can be recreated when each table is processed either out of RAM or by reading up from its backing store after a restart.

This has two key consequences:

There is no need to make sure that the free list is persistent and backed on the file store for each table because it can be reconstructed when needed, i.e., when a secondary replaces a dead primary on when the hyperserver restarts and the primary must become operational.

Any operation that frees a table entry (in any of the tables) has no need to reach the backing store because its free or busy state can be reconstructed from the other table entries.

The practical implications of the above are:

None of the free operations involving any of the table entries need to reach the secondaries.

None of the free operations involving any of the table entries need to reach the intent log and the backing store.

This is very useful in that it simplifies the logic of hyperserver updates for the namespace and reduces the I/O traffic to the intent log and the backing stores.

In any case, once any secondary has carried out the updates the primary requested, it has to first send the updates to its intent log and backing stores, then to relinquish the NT entry lock it acquired at the start of the operation and finally to let the sequencer know that the sequence ID it was using has been completely processed.

Hyperserver Member Restarts

As outlined previously, primaries can only change their role by leaving the hyperserver they belong to (either by crashing or by being evicted), whereas a secondary can become the primary when the primary is no longer around.

A situation that is somewhat similar is the one in which a hyperserver is restarted as a consequence of a system shutdown and of a subsequent start-up.

The two cases are similar in that a member that did not have that role has to become a primary. The difference between the two cases is that a secondary to primary transition implies that the member was already up and running, whereas a restart requires a set-up of the entire hyperserver member environment.

In the case of a secondary to primary transition, the secondary is already up and running. It only needs to continue to process read-type requests and must be capable of coordinating the write-type operations on its secondaries. In order to do this, with respect to the namespace, it needs to make sure that all the tables are in a consistent state and that it has available free lists to allocate new table entries, as needed.

In order to achieve the above, the newly elected primary does the following:

It resets the 'referenced' bit in each of the NT, FT and ST entries.

It scans the NT starting with the root namespace node and sets the 'referenced' bit for any entries it encounters in traversing the node tree.

At the end of the previous step, it scans the entire NT again. It frees all the entries that had the 'referenced' bit not set and adds them to the NT free list. For all the NT entries whose 'referenced' bit was set, it checks to see whether they have references to FT entries and/or to ST entries and sets the 'referenced' bit for those entries.

It then scans the FT and the ST table and frees and adds to the appropriate free list all the entries that had their 'referenced' bit not set.

At the end of the above, the integrity of the tables and of the free lists is fully reconstructed and the new primary is able to operate fully.

In the case of a hyperserver being restarted the primary needs to perform the above. However, before that, each of the hyperserver members must read the intent log files (if any), apply the updates to the backing stores and delete the processed intent logs. Once this is done, each member should read in each of the files into the appropriate table and complete the initialization and only the primary must reconstruct the free lists.

Initialization of New Members

In case a member is evicted from a hyperserver or crashes, a new member (if available) needs to take the place of the one that left.

Typically such a member does not have any of the information it needs to recreate its copy of the namespace. Therefore, the primary takes over the initialization of the new member by performing the following:

It sets the new member in a state such that it is not initially allowed to perform any client operations and the state of the hyperserver exported to the clients reflects this.

It sets a current position to the beginning of each of the namespace tables.

It starts scanning each of the tables and propagates the content of each entry in use to the new secondary.

As this is progressing, the primary updates its notion of the entry table being processed for each of the tables.

As incoming client requests arrive, the new secondary will not be addressed or will discard those that may reach it, by forwarding them to the primary. All the updates the primary performs may be broken down into updates that affect entries in each table that were already copied to the secondary or entries that are beyond the entry being copied. Those that precede the current entry need to generate updates to the secondary because the state of the copied entries has changed since the time the copy was performed. Those that follow the current entry can be disregarded because the updates will be applied as those entries are reached.

When all the entry tables have been processed, the primary can change the state of the hyperserver and mark the new secondary as operational.

At the end of this, the new secondary member is able to process namespace requests. If it has a Data Repository, its ability to respond to requests for files depends on the status of the data repository subsystem and needs to be handled by that component.

Other Uses for the Namespace

The structure of the namespace is general and not constrained to the POSIX view of pathnames. In particular, since entry 0 is the root node of all the namespaces, besides pointing to the root of the POSIX namespace it can also have other children.

This comes in handy if one wants to implement some kind of a distributed alternative namespace. Two of the many possibilities are:

An alternative namespace to collect the extent fingerprints. These would be distributed across hyperservers and hashing them would yield the HID of the hyperserver that manages each entry. This could be used to implement extent duplication, although is not targeted for the first release of the system.

Another alternative namespace could be used as a distributed dictionary used by the Hyperfiler system itself.

Note that although a namespace could be used to implement an Amazon S3-style Object Store on the Hyperfiler, it would not be necessary to use a special namespace because the first extent ID of a file (see below) could be used as the Object ID. The extent ID already identifies the hyperserver where it is stored and therefore it does not need additional indirections.

The Dataspace

The dataspace is implemented via the Data Repository subsystem. It aggregates containers for file data identified through unique Hyperfiler-wide Extent IDs (EIDs) that relate to the hypervolume where each such container resides. So, a reference to a data container within the namespace is one such unique ID and need not be hosted on the same hyperserver where the namespace component is placed.

The dataspace component of a hypervolume is the repository where file data is stored. It is an extent-based file system that manages logical blocks of 4 Kbytes. (In theory, 1 Kbyte logical blocks could provide the advantage that the average storage wasted per file would be 512 bytes per file, which could save substantial amounts of storage whenever a very large number of small files exists. 4 Kbyte blocks, on the other hand, push the average waste to 2 Kbytes per file and would increase the wasted space by a factor of four. However, since newer disk drives use 4 kbyte disk sectors, instead of the traditional 512 byte ones, choosing 4 Kbytes is compatible with both technologies and also reduces the number of block pointers needed to span larger files.)

Thus, the minimum size on disk for a non-empty file amounts to 4 Kbytes. This is a pure data block repository, as file metadata is entirely kept within the namespace.

A unique EID identifies any extent in the dataspace and allows the addressing of the extent from within the hyperserver that manages the dataspace, as well as from any client or other hyperserver. An EID is an 8-byte structure that contains the following fields and is handled as an opaque scalar out of its containing hypervolume:

The HID of the hypervolume where the extent was allocated. This makes the extent globally unique and addressable within the entire Hyperfiler.

The logical block offset of the starting block for the extent within the containing hypervolume. This directly identifies the logical block index of the starting block within the hypervolume.

The count of logical blocks the extent spans. This lets the cache manager know how much memory must be made available in the cache to read in the extent.

A single extent covers up to 4 Mbytes. When an extent is accessed it is read in its entirety. This means that any file no larger than 4 Mbytes can be read with a single disk I/O operation. This is a major boost in the efficiency of the I/O subsystem. An extent stays in cache until an LRU algorithm requires the space to be reclaimed and the cache implements prefetching so that, when sequential access is detected, the following extent can be read in before a read requests is received. (This should be the prevalent access mode in the Hyperfiler.)

For files that span multiple extents, the first extent also stores a map of all the file extents so that it is possible to perform fast seeks forward. When the initial extent needs to be purged from the extent cache, if the file is still being accessed, the area used for the extent map is retained in memory until the time when the file is closed. The extent map is itself organized much like the map of block pointers within a typical Unix file system i-node. It is an unbalanced tree-like structure in which the first few extents are pointed to directly, whereas subsequent extents can cause double indirections and then triple indirections for extremely large files.

Each file extent also contains a 20 byte SHA-1 fingerprint for the extent, computed at the time the extent is written. The individual extent fingerprints allow verification of the integrity of an extent. The first segment of a file also computes a fingerprint of all the fingerprints of the individual extents. This overall fingerprint, along with the file length is eventually able to provide a unique ID for the file instance. This is used in two ways: to verify the integrity of the entire file and will implement file-level deduplication in a future release of the system.

Writes to the extents are performed after first compressing the content of the extent, unless the type of file makes this pointless. A configuration facility helps in this determination to prevent virtually incompressible files from wasting CPU cycles. Likewise, data read in from the file system is decompressed before it is used. Customers can enable this behavior to trade off dataspace for CPU cycles. Further details on the dataspace and the Data Repository that supports it are in reference.

The Management of Client Requests

Once a client has mounted the root directory (or any other directory) available in the Hyperfiler it is allowed to access any files and directories the Hyperfiler makes available under the mounted directory, in compliance with the access protection privileges given to the requesting client.

A typical interaction between a client and the Hyperfiler occurs in the following fashion. The example shows how open, read, write and close calls would behave:

When the client needs to open a file under the mount point of the Hyperfiler, it locally hashes the file name via the DHT it received at mount time to retrieve the HID of the hyperserver responsible for that name.

It then asks the Hyperfiler network layer to send an open request to the namespace hyperserver whose HID it retrieved at the previous step.

The Hyperfiler network layer on the client maps the HID to the addresses of the HMs in the target namespace hyperserver. At this point, the network layer behaves differently depending on whether the request is an open to read from or to write to a file. In the case of an open for reading, any HM in the target namespace hyperserver can take care of the request. Thus the client chooses one HM on a random basis (in order to distribute the requests) and sends the HM the request. In the case of an open for writing, the primary HM of the namespace hyperserver should handle the request. So the client sends the request to it.

If successful, the HM of the namespace hyperserver retrieves a record containing the EID for the file that also points to the dataspace hyperserver that stores the file.

The namespace HM also selects the HM of the dataspace hyperserver that should provide access to the file data by differentiating between opens for reading or for writing. Reads following an open for reading can go to any dataspace HM. The namespace HM would choose a suitable one. For reads and writes after an open for writing the selected dataspace HM would be the hyperserver primary.

The HM of the namespace hyperserver then responds to the client request by returning the record containing the EID for the file (that also points to the dataspace hyperserver that stores the file) along with the dataspace HM it selected in step 5. Concurrently it also alerts the HM of the dataspace hyperserver that the file should be brought into the cache so that the subsequent I/O request from the client will be able to minimize the time it needs to access the data.

Note that in case the dataspace HM does not respond to a subsequent read request, the client can choose another HM at random if it is the case of an open for reading, in order to handle the error. If the open was for writing, on the other hand, it needs to wait for the dataspace primary member to respond (which may require a reconfiguration of the dataspace hyperserver, in case the original primary was no longer available).

Finally, the client would send the close request to the namespace HM it selected in step 3 above, along with the SID for the dataspace HM that carried out the requests, because the latter could have changed with respect to the one the namespace HM had selected, as explained in step 7. The namespace HM would propagate the close request to the dataspace HM that handled the previous I/O requests and this concludes the interactions.

In all this it is important that the same algorithms are applied across the board to make sure that the selection of HMs on the dataspace are consistent, no matter where the choice is performed.

We now turn to some specific examples of I/O operations on a typical prior art NAS system and using the Hyperfiler.

FIG. 2 is a diagram illustrating disk and network I/O operations that are typical of prior art network attached storage (NAS) systems for accessing a file with a path name including four directory levels. Four directory levels typically may be desirable for good directory access speed. Here the path is "/mnt/netapp/a/b/c/d/E", and each step along the path requires significant activity. In step 1, it is necessary to go to the root and read the i-node. In step 2, the root data is then used to retrieve the i-number of "a" and to return its handle. In step 3, the handle is used to look up "a" and to read the i-node of "a". In step 4, the retrieved data is used to retrieve the i-number of "b" and to return its handle. In step 5, the handle of "b" is used to read its i-node. In step 6, the retrieved data is used to retrieve the i-number of "c" and to return its handle. In step 7, the handle of "c" is used is to read its i-node. In step 8, the retrieved data is used to retrieve the i-number of "d" and to return its handle. In step 9, the handle of "d" is used to read its i-node. In step 10, the retrieved data is used to retrieve the i-number of "E" and to return its handle. Finally in step 11, the handle of "E" is used to read the data of "E", and to return the data of "E". The total number of disk I/Os for these operations is 10, and there are 6 network I/Os.

Figure 3:
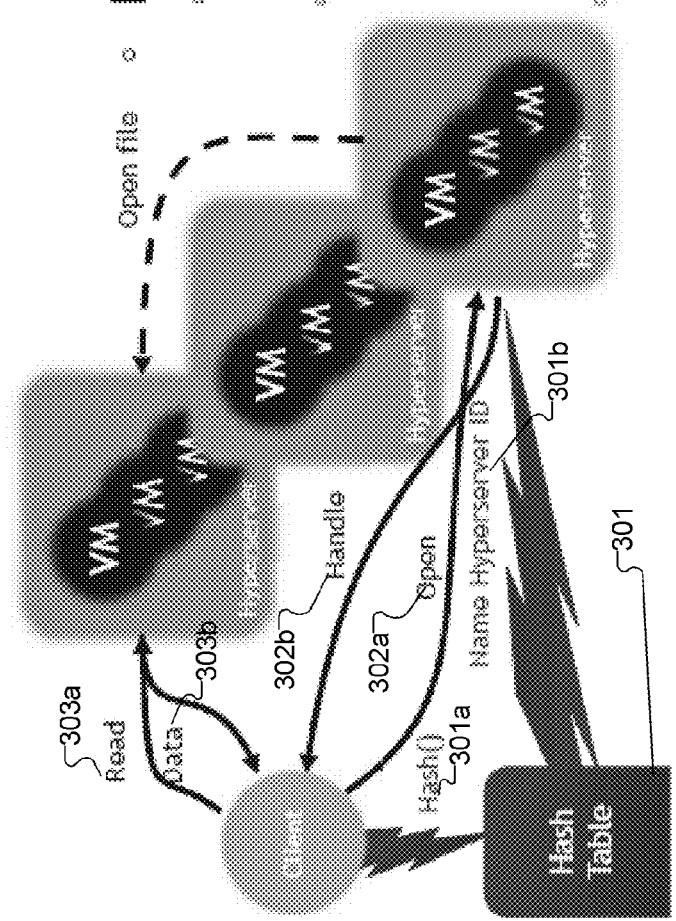
FIG. 3 is a diagram illustrating disk and network I/O operations that are required by a Hyperfiler in accordance with an embodiment of the present invention for accessing a file with the same path name as in FIG. 2.

FIG. 3 is a diagram illustrating disk and network I/O operations that are required by a Hyperfiler in accordance with an embodiment of the present invention for accessing a file with the same path name as in FIG. 2. In this case, the client stores hash table 301. In step 1, the client determines the hash 301a of the path name, accesses the hash table 301, and obtains the namespace hyperserver ID 301b, which identifies the relevant namespace hyperserver to which the client can present its storage request. In step 2, the client makes the open file request 302a to the identified namespace hyperserver, which returns the handle 302b and the ID of the relevant dataspace hyperserver to the client. In step 3, the client makes the read request 303a to the identified dataspace hyperserver and in return obtains the data 303b from the identified data hyperserver. For these operations, there has been a single disk I/O operation and just 2 network I/O operations.

Figure 4:
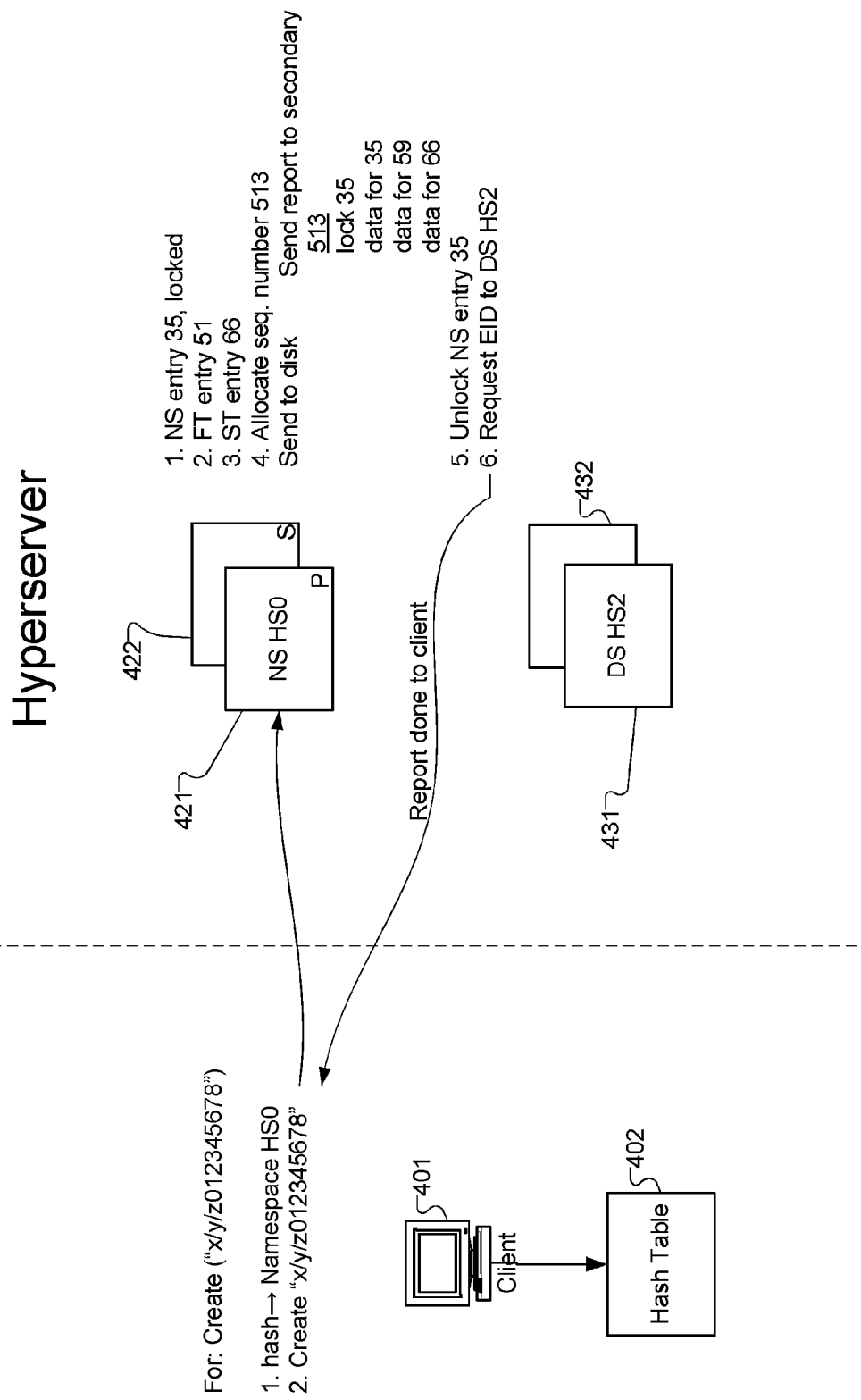
FIG. 4 is a diagram illustrating operations in Hyperfiler in accordance with an embodiment of the present invention for creating a file with the pathname "x/y/z012345678".

Whereas in FIG. 3 we illustrated a storage read, in FIG. 4, we illustrate a storage write. FIG. 4 is thus a diagram illustrating operations in Hyperfiler in accordance with an embodiment of the present invention for creating a file with the pathname "x/y/z012345678". In FIG. 4, the client initially makes a hash of the pathname and uses the its stored Hash Table 402 to determine which namespace hyperserver to use to make the storage request. In this example, it determines to make the request to namespace hyperserver HS0. Also in this example, the namespace hyperserver HS0 includes a primary member 421 and a secondary member 422. The primary member gets the storage request, and in step number 1, allocates namespace entry 35 to this request, stores path data in this entry and then locks the namespace entry 35. Similarly it makes File Table entry 51 in step 2 and String Table entry 66 in step 3. In step 4, it allocates sequence number 513 to this write request and sends it to disk using dataspace hyperserver HS2 (which has primary member 431 and secondary member 432. Also the primary sends a report to secondary member 422 about the sequence 513, including the instruction to lock namespace entry 35, and data for FT entry 51 and ST entry 66. In step 5, after receiving an acknowledgement from secondary member 422 (which has carried out the instructions sent at step 4 and has subsequently unlocked node entry 35 that it had locked at the start of the sequence) the primary member unlocks namespace entry 35. In step 6, the primary requests the Extent ID from dataspace server HS2, and also reports to the client that the Create request has been done, returning to the client a handle that the client will then be able to use to perform reads and writes on dataspace hyperserver HS2 without any need to further interact with namespace hyperserver HS0.

Although we have described FIG. 4 with reference to locking the NS entry 35, when the file is created, in various embodiments, there is an additional lock, namely of the node representing the parent directory in the namespace, so as to (1) prevent other operations from being made on the same directory at the same time and (2) allow the parent directory node to point to the newly created child node representing the new file. When the file operation is merely to change an attribute of an existing file, then the lock of the parent directory is not required, so only the affected node needs to be locked. If additional nodes need to be locked, as in the case of the parent directory just mentioned, instructions to do so are part of the instructions the primary namespace hyperserver member 421 sends to its secondaries (such as member 422) in step 4.

III. Operational Behavior

This section illustrates the standard behavior of the Hyperfiler, along with the facilities made available to automatically deal with system integrity, failures and data recovery.

System Setup and Administration

A Hyperfiler is managed through a simple GUI interface that allows it to be configured in about 10 minutes and new HMs to be added in less than 5 minutes.

The System Management component of the Hyperfiler performs all the server-side functions needed to automatically manage the system, including monitoring and alerting.

The Hyperfiler set up is initially accomplished by assigning HMs to it, along with the storage each HM manages. In the configuration phase, it is important to also identify the physical server where each HM resides. This is an important piece of information, since it lets the System Management know which HMs are good candidates to be a member of the same hyperserver: in order to avoid Single Points of Failure (SPOF), each hyperserver must be made of HMs hosted on distinct physical nodes.

It is important for the HMs used within the same storage tier to run on hardware that is comparable (in terms of RAM, CPU and network capabilities), to be based on the same kind of storage (SANs, local drives, etc. etc.) and to manage very comparable physical volumes. Major discrepancies in this may in fact cause performance problems by lowering the performance of a hyperserver to that of its weakest component.

System Management aggregates hyperservers by making sure that the SPOFs are avoided. It also tries to group together HMs with the same capacity and capabilities.

Normal System Operation

Linux clients that want to use the Hyperfiler need to load a kernel loadable module. The latter can be loaded and unloaded as the Linux system is running, although the unload operation is permitted only when the client has stopped accessing the Hyperfiler and has "unmounted" it (see below).

Once the kernel module is loaded and active, a client can perform a mount operation on an empty directory within the local file system (the mount point), just as for NFS. After that, any access to files or directories whose pathname reaches below the mount point involves the kernel module that maps the pathname to the appropriate file system object in the Hyperfiler. This process is transparent to the applications. Note that multiple mount points to the same or to different Hyperfilers can coexist within the same client and that a client can mount NFS filer directories as well as Hyperfilers.

The minor restrictions to the POSIX semantics described above apply to such accesses. Most notably, multiple threads are not allowed concurrent write access to the same file, in that the first open for writing goes through, while subsequent requests return an error (the EBUSY error) until the file is closed and becomes the current version of the file. On the other hand, opens for reading while a file is open for writing will automatically reference the previous version of the file.

The fact that the Hyperfiler implements the POSIX semantics implies that any applications running on the client and accessing files and directories in the Hyperfiler run without any changes.

The Hyperfiler makes also available HTTP/HTTPS access to files. For this, a component that supports this protocol runs within the Hyperfiler and each Hyperfiler implements a subdomain server. Thus any requests referencing names that are relative to the subdomains the Hyperfiler has been configured to support are directly passed to the HTTP/HTTPS component. The subdomain manager round-robins incoming requests across all the available such components so as to distribute the load across the entire Hyperfiler. However, in the interpretation of the URL the subdomain server tries to have requests handled by the hyperserver that manages the object of interest.

Future versions of the system will support NFS access in a similar fashion. A future Hyperfiler version will also support Windows clients by supplying a Windows redirector that uses the native Hyperfiler protocol.

Error Detection and Recovery

The Hyperfiler monitors the integrity of files and directories in the distributed file system and is able to detect any inconsistencies that might possibly arise. Local inconsistencies are handled immediately. For example, if a member of a hyperserver detects an I/O error while reading a file, it immediately marks the file extent as bad, asks another member of the hyperserver to complete the request and resynchronizes the content of the file with that of the member that has a valid copy.

Hypervolume and Hyperserver Restoration

When a member of a hyperserver detects inconsistencies in its hypervolume instance it can act differently, depending on the nature of the inconsistencies. Minor inconsistencies should be handled right away, as described in the previous section. However, if the content of the namespace or that of the dataspace is compromised, the member HM should trigger a full hypervolume resynchronization. The same happens when a new HM is assigned to a hyperserver.

The operation occurs in two steps:

The first phase amounts to resynchronizing the namespace, if it is supposed to be present and the namespace resynchronization is needed. This entails copying the namespace content, as stored in the persistent image available on the hyperserver primary. This is done as the system is running. At the end of the process, the primary momentarily holds incoming update requests until the new HM is fully synchronized. After this, update requests are enabled as is the new member. (Details on how this is accomplished in the Name Space are in the section above entitled "Initialization of New Members".)

The second phase accomplishes a similar task for the dataspace, if it exists for the hyperserver being restored.

Note that the first phase is certainly faster than the second one because of the relative size of the two repositories to be restored. Nevertheless, the new member can start serving requests as soon as its namespace is fully restored, at the end of phase 1. Until phase 2 is complete, the new HM will not reply to requests involving the dataspace and will let the other hypervisor member reply instead.

In case all the members of a hyperserver go away or crash, file system objects supported by that hyperserver will become unavailable. For this reason, it is highly desirable to configure the system with adequate redundancy. In such a case, System Management operates differently between the case in which the hypervolume relies on highly available block storage or whether redundancy is built by the Hyperfiler on top of local hard drives.

In the first case, System management must simply manufacture a new hypervisor out of available HMs and assign to it the redundant storage resources the hyperserver owns.

However, if the storage is implemented via replication of non-redundant local storage, the system waits for one of the original hypervisor members to restart and then it rebuilds the redundancy on the namespace and of the data from the available copy.

Migration Between Storage Tiers

When multiple storage tiers exist within a Hyperfiler and if this feature is enabled, the system monitors accesses to files. The customer is allowed to set a time window of reference called the file migration window. Periodically the system takes a look at the namespace within each hyperserver. If a given file has not been referenced within the last migration window, it is moved to a lower storage tier (if one exists). If enabled, the system also takes care of migrating files to an upper storage tier the next time a file in a lower tier is referenced, which keeps the files in the storage tiers where they should belong.

Scrubbing and Scavenging

Bitrot and sector degradation may occur once data has been written. For this reason the system performs scrubbing of the existing data. The primary in each hyperserver scans the namespace and the data portion of each hypervolume on all the members to make sure they are synchronized, that there is no corrupt data and that any data orphaned but not deleted because of malfunctions is purged.

This is an I/O intensive activity and could end up having impact on the overall performance of the hyperservers. Therefore, since the system keeps track of the amount of I/O in progress, it is able to make sure that this happens only when the system is not heavily loaded and occurs in such a way that a preconfigured percentage of CPU, RAM, disk and network bandwidth is not exceeded.

Hyperfiler Expansions and Upgrades

Because of its architecture, a Hyperfiler is inherently expandable. Whenever additional storage is needed or additional performance is required, it is possible to add new HMs to the Hyperfiler in a dynamic fashion, that is, without disrupting ongoing operations.

In doing this, the following criteria should be respected:

The number of HMs to be added to a given storage class should be a multiple of the cardinality of that class. The HMs added to a given storage tier should have similar configurations in terms of RAM and storage available and should run on CPUs with similar power.

The description of the server where an HM is hosted should always be accurate, so as to avoid situations in which members of the same hyperserver run on the same machine. This would in fact cause the HM-level redundancy to be nonexistent.

Note that also the increase in cardinality in a storage tier could be handled the same way. Also, making use of the intrinsic redundancy of the Hyperfiler, upgrades can be performed without disrupting ongoing operations. Basically, one HM at a time is upgraded, thus allowing the hyperserver they belong to continue operating as this process is being performed.

Constraints and Limitations in the Present Embodiment

The Hyperfiler architecture herein is quite general and is able to accommodate many variants of deployment. However, in order to simplify the developments for an initial release, it is desirable to constrain the number of possible combinations. This section discusses such limitations.

Hypervolumes and Hyperservers

In implementing HMs that support both a namespace service and a dataspace one simplifies the deployments, especially for System Management, which is expected to aggregate the HMs into hyperservers. However, since we need to use directly attached hard drives (We will refer to this case as involving "DASD", short for Directly Attached Storage Device), as well as LUNs provisioned via SANs or SAN-like infrastructures, some complications arise, caused by the following:

LUNs on a SAN are generally highly available so that, there is no intrinsic value in offering replication for the dataspace. In fact, this would be a waste of storage because the LUNs already offer redundancy and need no additional replication via hyperservers.

The namespace should always be replicated, by using hyperserver with a cardinality set to 2, at least. This is desirable because it reduces significantly the probability that during an HM restart certain portions of the namespace may temporarily become inaccessible. Moreover, this allows to have the namespace load to be shared across multiple HMs. These considerations apply both to DASD storage and to redundant LUNs.

For LUNs then one would have the namespace replicated whereas the dataspace would be not replicated within the Hyperfiler. This clearly points to the fact that the requirements between SAN-based implementations and DASD-based ones diverge because in the latter case both services would benefit from replication. Devoting HMs exclusively to either the namespace service or the dataspace service may be take up more RAM than when some HMs host both because the RAM used by the kernel would be increased for each individual HM. However, such segregation of services would also have some benefits: It would add simplifications to the creation and management of HMs, for example, by treating the same way DASD-based configurations and SAN-based ones. It would provide better fault isolation, such that a problem with the namespace service would not also bring down the dataspace service that could be cohosted within the same HM. The amount of kernel data needed in an HM would certainly be strictly correlated to the number and complexity of the services run by the HM. So roughly speaking one could expect that the amount of kernel RAM needed by a given service would be roughly the same whether the service would be segregated in an HM or not. Finally, it is certainly possible to minimize the size of the kernel image and executables used within each HM and it is possible to inform the hypervisor that the kernel code pages could be shared across HMs, which would also bring down the memory requirements. Because of all the above considerations, it appears reasonable to have the first release of the Hyperfiler to devote each HM to either the namespace service or to the dataspace service, but not both.

Configuration of Each HM

On the basis of the fact that in the first Hyperfiler release each HM will either host the namespace service or the dataspace service, the following criteria will be applied in choosing the allocation of resources: 10 GB of data space will be available for each HM running the namespace service. As much of a drive as possible will be available for each HM running the dataspace service. Adequate amounts of space for the root file system and the swap area will be available for either HM type. About 1.5-2 GB of RAM will be available to each HM to be used by the service it runs. About 800 MB will be available for each HM kernel. (This is a maximum. If possible, by reducing the amount of needed components and by sharing kernel code pages across HMs, this should be shrunk further.) Roughly ¼ of a core will be devoted to each HM. Roughly 2 HMs will be allocated for each drive.

CONCLUSIONS

The Hyperfiler, in embodiments herein, implements a highly available scale-out file system with a single namespace. The system is ideally suited to provide a highly available shared file storage platform aimed at web-scale applications, offering indefinite scalability in terms of capacity and performance, absence of intrinsic bottlenecks, and the ability to open files in a random set with a single disk I/O operation. This last characteristic alone entails performance advantages by a factor of 10 for most files and allows a drastic reduction in the count of drive spindles. The separation of the namespace from the dataspace allows them to be placed on the secondary medium that is most appropriate for the application environment, such as SATA drives or SSDs. A file system with these characteristics is based on trade-offs relying on the components of modern industry standard servers and therefore capitalizes on the availability of multi-core CPUs, large amounts of RAM, high network bandwidth and low network latency. The ideal workloads for this system consist of read-write traffic with prevalent reads, in which database type access is not needed. The system offers compliance with the POSIX standard, thus freeing applications developers from being locked into vendor-specific APIs and allowing existing applications based on NFS to run unchanged. The fact that the Hyperfiler can expand indefinitely within a single namespace implies that the customer has no need to struggle with complex mount maps to reach all the storage devices as the Hyperfiler behaves and is managed as a single entity. Flexibility in the way the namespace is handled in terms of amount of RAM devoted to it and nature of the swap device, along with the number and types of storage tiers supported allows extreme flexibility in the desired cost/performance ratio to be obtained.

A Hyperfiler aggregates together thousands of HMs into hyperservers with up to 4-member HMs. Coordination of the updates need only be performed within a single hyperserver. Therefore, the performance of the system can scale linearly because the combinatorial explosion of communications that destroys the linearity in traditional clusters and constrains the number of nodes they can support does not limit the Hyperfiler. The use of traditional file names and POSIX semantics allows the application developer to convey information via the file names. This can be contrasted with Object Stores in which, at some level, it is always necessary to rely on external mapping layers to translate names and attributes to object IDs. The HA infrastructure avoids the need to embed replication features within the application layer. Reliance on HMs and on the storage devices they use shields the users from having to buy specialized appliances or ad hoc hardware. All in all, a system like the Hyperfiler, especially designed for large-scale web applications, can achieve the trade-offs this market segment requires. The Hyperfiler concretely translates its innovative technology into major savings in terms of reduction of complexity, lowered acquisition costs, lowered development costs on the application and infrastructure side and lowered operational costs, as the Hyperfiler largely manages itself automatically. It also offers superior performance and availability.

What is claimed is:

1. A method of establishing a software-defined network attachable storage system in a plurality of logical computer systems, each computer system having memory, a processor, and a storage system, the method comprising:
running a set of programs in the logical computer systems that establish (i) a plurality of namespace servers, each namespace server operating autonomously in a distinct partition of a namespace, and (ii) a plurality of dataspace servers, each dataspace server operating in an assigned partition of a dataspace associated with the storage system;
wherein:
(i) in order to process a given pathname request from at least one requesting client computer, the at least one requesting client computer computes a hash value based on the given pathname and uses the hash value with a hash table to obtain the identity of a specific one of the namespace servers;

(ii) the specific one of the namespace servers is configured:
(a) to store persistently, in its memory, filesystem metadata associated with the distinct partition of the namespace corresponding to the specific one of the namespace servers; and
(b) to use the metadata that is persistently stored in its memory in processing the given storage system pathname request from the at least one requesting client computer to return to the at least one requesting client computer a handle that identifies (i) a particular one of the dataspace servers and (ii) a particular logical block index in the dataspace;
(iii) the handle is used by the at least one requesting client computer to select the particular one of the dataspace servers; and
(iv) the particular one of the dataspace servers satisfies the given pathname request by accessing the particular logical block index in the dataspace identified by the handle.

2. A method according to claim 1, wherein at least one proper subset of the namespace servers is configured to operate as a cluster, such that each namespace server in the cluster (i) processes pathname requests for a shared distinct partition of the namespace, and (ii) stores persistently, in its memory, filesystem metadata associated with the shared distinct partition.

3. A method according to claim 2, wherein the number of namespace servers in the cluster is selected to achieve desired levels of speed, redundancy, and availability under projected load conditions.

4. A method according to claim 2, wherein in the course of handling updates to the shared distinct partition of namespace data being managed by the cluster, each successive update thereto is given a sequence number, and logical computer systems of the cluster are configured to operate asynchronously while still retaining a predefined order of updating based on the sequence number.

5. A method according claim 1, wherein at least one proper subset of the dataspace servers is configured to operate as a cluster, to store and retrieve user data in its storage system based on handles determined by the namespace servers, for a shared distinct partition of the dataspace.

6. A method according to claim 5, wherein the number of dataspace servers in the cluster is selected to achieve desired levels of speed, redundancy, and availability under projected load conditions.

7. A method according to claim 1, wherein at least some of the logical computer systems are virtual computer systems.

8. A method according to claim 1, wherein the first and second sets of logical computer systems are disjoint.

9. A method according to claim 1, wherein the first and second sets of logical computer systems are not disjoint.

10. A method according to claim 1, wherein the filesystem metadata is structured according a Patricia Tree data structure so that shared prefixes of pathnames are stored compactly.

11. A method according to claim 10, wherein the filesystem metadata is stored in (i) a nodes table encoding the Patricia Tree, and (ii) a file table encoding attributes of files and directories, and (iii) a string table encoding names, of strings, having a length greater than a maximum length used in the nodes table.

12. A method according to claim 11, wherein each of the nodes table, the file table, and the string table is dynamically stored in a distinct file for persistence.

13. A method according to claim 12, wherein any change to any of the nodes table, the file table, or the string table is stored in an intent log, and the intent log is used dynamically to update the files corresponding to such tables.

14. A method according to claim 1, wherein the at least one requesting client computer computes the hash value using a hash function, the hash function performing a many-to-one mapping of a parent directory for the pathname to an entry in the hash table.

15. A method according to claim 1, wherein the hash table stores hyperserver identification numbers used to identify the namespace servers, each hyperserver identification number being associated with a set of IP addresses, wherein each IP address corresponds to a member of the hyperserver.

16. A method according to claim 1, wherein a network layer of the at least one requesting client computer client converts a hyperserver identification number of the specific one of the namespace servers to an IP address of a member of a hyperserver.

17. A method according to claim 1, wherein
the specific one of the namespace servers determines, based on the given storage system pathname request from the at least one requesting client computer, whether the hash table stored on the at least one requesting client computer is out of date, and, in the event that the hash table is determined to be out of date, the specific one of the namespace servers sends an out-of-date message to the at least one requesting client computer.

18. A method according to claim 17, wherein the specific one of the namespace servers determines whether the hash table is out of date based on a generation number in the given storage system pathname request.

19. A method according to claim 17, wherein in response to the out-of-date message, the at least one requesting client computer is caused to update its hash table.

20. A method according to claim 19, wherein, in the event that the hash table on the at least one requesting client computer has become out of date owing to (i) enlargement of the namespace to include at least one additional namespace server, (ii) redistribution of entries in the namespace, or (iii) enlargement of the hash table, the at least one requesting client computer is caused to update its hash table to obtain a hash table corresponding to the enlarged namespace.

21. A method according to claim 19, wherein, in the event that the hash table on the at least one requesting client computer has become out of date owing to a rearrangement of the namespace, the at least one requesting client computer is caused to update at least a portion of its hash table to obtain a hash table corresponding to the rearranged namespace.

* * * * *